US012627776B2

(12) United States Patent
Pillai

(10) Patent No.: US 12,627,776 B2
(45) Date of Patent: May 12, 2026

(54) METHODS AND SYSTEMS FOR COMMUNICATIONS MANAGEMENT

(71) Applicant: COMCAST CABLE COMMUNICATIONS, LLC, Philadelphia, PA (US)

(72) Inventor: Ramasamy Thalavay Pillai, Chennai (IN)

(73) Assignee: Comcast Cable Communications, LLC, Philadelphia, PA (US)

( * ) Notice: Subject to any disclaimer, the term of this patent is extended or adjusted under 35 U.S.C. 154(b) by 78 days.

(21) Appl. No.: 17/980,717

(22) Filed: Nov. 4, 2022

(65) Prior Publication Data

US 2024/0155083 A1 May 9, 2024

(51) Int. Cl.
*H04N 7/18* (2006.01)
*G08B 3/10* (2006.01)

(52) U.S. Cl.
CPC .............. *H04N 7/186* (2013.01); *G08B 3/10* (2013.01)

(58) Field of Classification Search
CPC ..... H04N 7/186; G08B 3/10; G08B 13/19684
See application file for complete search history.

(56) References Cited

U.S. PATENT DOCUMENTS

| | | | |
|---|---|---|---|
| 9,462,379 B2 | 10/2016 | Ivanov et al. | |
| 2013/0035941 A1 | 2/2013 | Kim et al. | |
| 2015/0156031 A1* | 6/2015 | Fadell .................. | G08B 27/003 |
| | | | 700/90 |
| 2016/0249396 A1 | 8/2016 | Kolekar | |
| 2016/0353173 A1 | 12/2016 | Du et al. | |
| 2019/0364244 A1* | 11/2019 | Siminoff .............. | G08B 27/003 |
| 2020/0267354 A1* | 8/2020 | Siminoff ................ | G06V 40/16 |
| 2020/0394882 A1* | 12/2020 | England .................... | E06B 7/30 |

* cited by examiner

*Primary Examiner* — Jared Walker
(74) *Attorney, Agent, or Firm* — Ballard Spahr LLP

(57) ABSTRACT

A media device, such as a set-top-box, may receive an indication that a video doorbell on the premises has been activated. The indication may activate an application associated with the video doorbell within the set-top-box. While the application is in use, a communication pathway may be created between the set-top-box and the video doorbell. For example, audio and/or video detected by the video doorbell may be sent, directly or indirectly, via the application, to the set-top-box for display on a television or other display. Furthermore, while the application is in use, user voice data for a user associated with the media device may be captured by a voice-enabled remote control and routed to the set-top-box or smart television and then to the video doorbell for output at the video doorbell.

20 Claims, 8 Drawing Sheets

FIG. 4

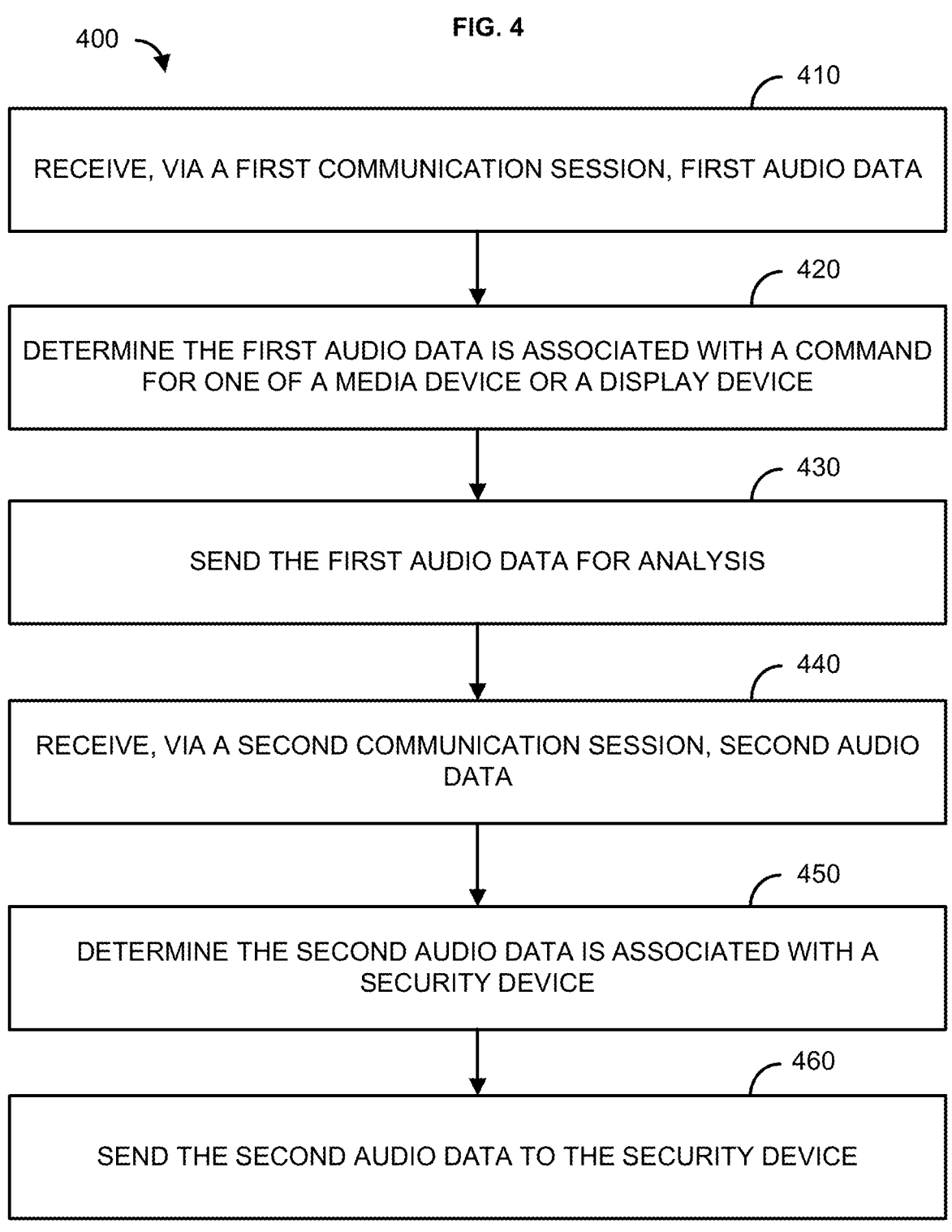

400

RECEIVE, VIA A FIRST COMMUNICATION SESSION, FIRST AUDIO DATA
— 410

DETERMINE THE FIRST AUDIO DATA IS ASSOCIATED WITH A COMMAND FOR ONE OF A MEDIA DEVICE OR A DISPLAY DEVICE
— 420

SEND THE FIRST AUDIO DATA FOR ANALYSIS
— 430

RECEIVE, VIA A SECOND COMMUNICATION SESSION, SECOND AUDIO DATA
— 440

DETERMINE THE SECOND AUDIO DATA IS ASSOCIATED WITH A SECURITY DEVICE
— 450

SEND THE SECOND AUDIO DATA TO THE SECURITY DEVICE
— 460

500

510

RECEIVE AN ACTIVATION SIGNAL

520

INITIATE A COMMUNICATIONS APPLICATION ASSOCIATED WITH A VIDEO DOORBELL

530

ESTABLISH A COMMUNICATION SESSION BETWEEN THE USER DEVICE AND THE VIDEO DOORBELL

540

RECEIVE USER AUDIO DATA

550

SEND THE USER AUDIO DATA TO THE VIDEO DOORBELL

600

610

RECEIVE AN ACTIVATION SIGNAL FROM A SECURITY CAMERA

620

INITIATE A COMMUNICATIONS APPLICATION ASSOCIATED WITH THE SECURITY CAMERA

630

ESTABLISH A COMMUNICATION SESSION BETWEEN THE USER DEVICE AND THE SECURITY CAMERA

640

RECEIVE USER AUDIO DATA

650

SEND THE USER AUDIO DATA TO THE SECURITY CAMERA

700

710

RECEIVE A NOTIFICATION TO BEGIN COMMUNICATION SESSION

720

DETERMINE NOTIFICATION IS ASSOCIATED WITH A COMMUNICATIONS APPLICATION

730

INITIATE COMMUNICATIONS APPLICATION ASSOCIATED WITH THE NOTIFICATION

740

RECEIVE REMOTE AUDIO DATA

750

CAUSE REMOTE AUDIO DATA TO BE OUTPUT

760

RECEIVE LOCAL AUDIO DATA

770

SEND THE LOCAL AUDIO DATA TO A REMOTE MEDIA DEVICE

METHODS AND SYSTEMS FOR COMMUNICATIONS MANAGEMENT

BACKGROUND

Certain conventional media devices that are capable of providing audio/visual content to its users lack microphone inputs for receiving user audio data from users positioned near the media device. This can prevent the nearby user from providing audio data (e.g., voice input) and the media devices from receiving the user audio data from users located in proximity to the media device. This can also prevent users from providing voice communication to other users in another location (e.g., in another room, outside a residence, at another building or residence) via the media device.

SUMMARY

It is to be understood that both the following general description and the following detailed description are exemplary and explanatory only and are not restrictive. Methods and systems for communications management are described. A user may receive an indication that a video doorbell or other similar security device on the premises has been activated. The indication may be received by a set-top-box, smart television or other media device. The indication may include a notification that may be displayed on the television or other display associated with the media device that the doorbell or other security device has been activated and may provide an opportunity for the user to select to engage with the video doorbell. For example, the indication may activate a module or application associated with the video doorbell within the set-top-box or smart television. While the module or application associated with the video doorbell is in use, a communication pathway may be created between the set-top-box or smart television and the video doorbell or other security device. For example, audio and/or video detected by the video doorbell may be sent, directly or indirectly, via the module or application, to the set-top-box or smart television. Furthermore, while the application associated with the video doorbell is in use, user voice data for a user associated with the media device or display may be captured by a user device, such as a voice-enabled remote control, and routed to the set-top-box or smart television and then to the video doorbell for output at the video doorbell.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the apparatuses and systems described herein:

FIG. 4 shows a flowchart of an example method for managing communications;

DETAILED DESCRIPTION

Figure 1:
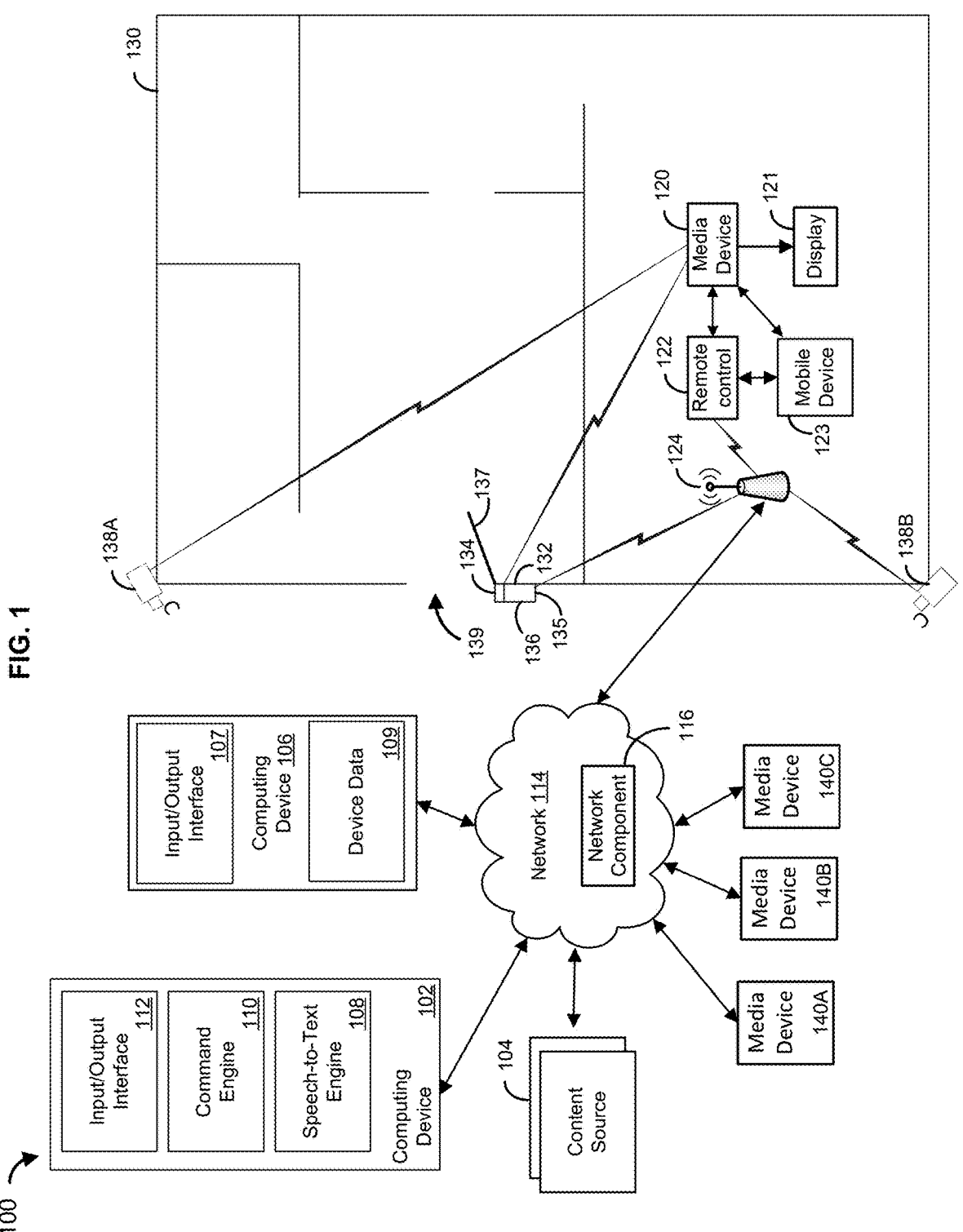
FIG. 1 shows an example system for communications management.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memristors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG-2, MPEG, MPEG-4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (0.7PG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

Methods and systems are described herein for managing communications between devices. FIG. 1 shows an example system 100. The example system 100 may be configured for managing communications between devices (e.g., media devices, security devices, network devices, user devices, display devices, etc.). Although only certain devices and/or components are shown, the system 100 may comprise a variety of other devices and/or components that support a wide variety of network and/or communication functions, operations, protocols, content, services, and/or the like. The system 100 may comprise a plurality of computing devices/ entities in communication via a network 114. The network 114 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent on the network 114 via a variety of transmission paths, including wireless paths (e.g., satellite paths, Wi-Fi paths, cellular paths, etc.) and terrestrial paths (e.g., wired paths, a direct feed source via a direct line, etc.). The network 114 may comprise public networks, private networks, wide area networks (e.g., Internet), local area networks, and/or the like.

The network 114 may comprise a content access network, content distribution network, security network, and/or the like. For example, the network 114 may be configured to provide content from a variety of sources using a variety of network paths, protocols, devices, and/or the like. The network 114 may also be configured to analyze audio data associated with one or more requests and provide command information or signals based on that audio data. The network 114 may also be configured to receive security data and provide the security data to one or more devices. For example, the network 114 may represent multiple separate networks, each providing one or more of the services described above. The network 114 may be managed (e.g., deployed, serviced) by, for example, a content provider, a service provider, and/or the like. The network 114 may deliver content (e.g., content items) from a content source 104 to one or more other computing devices (e.g., media devices 120, 140A-C). For example, each media device 120, 140A-C may comprise one of a set top box, a television, a smart television, or a monitor The network 114 may comprise or be in communication with a network component 116. The network component 116 may be any device, module, combinations thereof, and the like communicatively coupled to the network 114. The network component 116 may be a router, a switch, a splitter, a packager, a gateway, an encoder, a storage device, a multiplexer, a network access location (e.g., tap), physical link, combinations thereof, and the like.

The system 100 may comprise a computing device 102. The computing device 102 may be a server. For example, the computing device 102 may be a cloud-based server. The computing device 102 may be configured to receive audio data (e.g., user voice data) from media devices (e.g., media devices 120, 140A-C) and/or user devices (e.g., a voice-enabled remote control 122, mobile device 123, a voice assistant device, a smart speaker, a Bluetooth headset, etc.). For example, the computing device 102 may comprise an input/output interface 112. The input/output interface 112 may be configured to connect, cause to connect, launch, cause to launch, run, cause to be run, execute, cause to be executed, initiate, or cause to be initiated a communication session between the computing device 102 and one or more of the media devices (e.g., media devices 120, 140A-C) and/or user devices (e.g., a voice-enabled remote control 122, mobile device 123, a voice assistant device, a smart speaker, a Bluetooth headset, etc.) via the network 114 or another network.

The computing device 102 may be configured to convert the received audio data to text data. For example, the computing device 102 may comprise a speech-to-text engine 108. The speech-to-text engine 108 may be configured to receive the audio data. Further, the speech-to-text engine 108 may be configured to convert the received audio data to text or text data.

The computing device 102 may also comprise a command engine 110. The command engine 110 may be configured to analyze the text or text data converted from the audio data to determine one or more commands or actions being requested in the received audio data. For example, the command engine 110 may receive text that states "change to channel 38". The command engine 110 may compare one or more of the words or phrases in the text to a stored database of commands or actions to determine the command or action being requested. For example, the command engine 110 may parse the text into one or more words or phrases and compare the parsed portions of the text to the stored database of commands or actions. The command engine 110 may determine that a user associated with media device and/or user device wishes to change the channel of their television to channel 38. The command engine 110 may determine the code or instructions to provide to the media device in order to change the channel from the current channel to channel 38. The command engine 110 or the computing device 102 may send the code or instructions, using the input/output interface 112 to the media device (e.g., media devices 120, 140A-C) or user device (e.g., a voice-enabled remote control 122, mobile device 123, a voice assistant device, a smart speaker, a Bluetooth headset, etc.) that initially sent the audio data to the computing device 102. Accordingly, the computing device 102 may cause the media device (e.g., media devices 120, 140A-C) and/or display 121 associated with the media device to change the channel from the current channel to channel 38 based on the instructions or code provided.

The system 100 may comprise the one or more content sources 104, each of which may be a server or other computing device. The content source 104 may receive a plurality of content which may comprises a plurality of content items. The content may be video content, audio content, web-based content, audio/video content, games, applications, data, etc. The content may be live content (e.g., a linear content stream) audio-on-demand content, video-on-demand (VOD) content, web data, application data, or the like. The content source 104 may receive source content from an external server or device (e.g., a stream capture source, a data storage device, a media server, etc.). The content source 104 may receive the source content via a wired or a wireless network connection, such as the network 114 or another network (not shown). For example, the content source 104 may be a multicast or a unicast content source configured to send or otherwise transmit content via a multicast or unicast transmission.

The content source 104 may be managed by a third-party, such as content providers, service providers, online content providers, over-the-top content providers, and/or the like. The content source 104 may be configured to provide content (e.g., content items) via the network 114 or another network. Content may be accessed by one or more media devices 120, 140A-C via applications, such as mobile applications, television applications, set-top box applications, gaming device applications, web-based applications, and/or the like. An application may be a custom application (e.g., by a content provider, for a specific device), a general content browser (e.g., a web browser), an electronic program guide, and/or the like.

Although one content source 104 is shown in FIG. 1, this is not to be considered limiting. In accordance with the described techniques, the system 100 may comprise any number of content sources, each of which may receive and provide any number of content items.

The system 100 may comprise a computing device 106. The computing device 106 may be a server. For example, the computing device 106 may be a cloud-based server. For example, the computing device 106 may be an application-based server associated with a security application and/or video doorbell application. The computing device 106 may be configured to receive at least one of audio data, video data, and/or audio/video data (e.g., security data) from one or more security devices (e.g., video doorbells 132 and/or security cameras 138A-B). For example, the computing device 106 may comprise an input/output interface 107. The input/output interface 107 may be configured to connect, cause to connect, launch, cause to launch, run, cause to be run, execute, cause to be executed, initiate, or cause to be initiated a communication session between the computing device 106 and one or more of the security devices (e.g., the video doorbell 132 and/or one or more of the security cameras 138A-B) via the network 114 or another network. For example, the computing device 106, via the input/output interface 107, may be configured to receive at least one of video data and/or audio data (e.g., collectively "security data") from the one or more security devices (e.g., video doorbells 132 and/or security cameras 138A-B). For example, the security data may include or be associated with metadata. For example, the metadata may include user information. The user information may identify the user or users associated with the one or more security devices, contact information for the user, a location or address for the user, a URL or network address associated with the user, a MAC address associated with the user, an email address associated with the user, and/or URLs or network addresses associated with one or more media devices associated with the user.

The computing device 106 may comprise a device data database 109. For example, the computing device 106 may store all or a portion of the received security data in the device data database 109. For example, the computing device 106 may determine, based on the metadata or another portion of the security data, one or more users or identifiers to associate the received security data with. The computing device 106 may then store the received security data in the device data database 109 based on the association. For example, the security data may be associated with a user name, user phone number, user address, the one or more security devices associated with a user, a MAC address associated with the user, an email address associated with the user, or in any other manner.

The computing device 106, input/output interface 107, may be configured to connect, cause to connect, launch, cause to launch, run, cause to be run, execute, cause to be executed, initiate, or cause to be initiated a communication session between the computing device 106 and one or more of the media devices (e.g., media devices 120, 140A-C) and/or user devices (e.g., a voice-enabled remote control 122, mobile device 123, a voice assistant device, a smart speaker, Bluetooth headset, etc.) via the network 114 or another network. For example, the computing device 106 may be configured to send all or a portion of the received security data (e.g., at least one of video data, audio data, or audio/video data) to the one or more of the media devices (e.g., media devices 120, 140A-C) and/or user devices (e.g., a voice-enabled remote control 122, mobile device 123, a voice assistant device, a smart speaker, a Bluetooth headset, etc.) via the network 114 or another network.

The system 100 may comprise a premises 130. The premises 130 may be a building, portion of a building, house, townhouse, condominium, apartment, duplex, office, or the like. The premises 130 may be occupied by one or more users. The premises 130 may comprise a point of entry 139 (e.g., a doorway). Access may be restricted through the point of entry 139 by one or more doors 137, which may be adjustable from an open position to a closed position. The premises 130 may also include one or more rooms and/or one or more floors.

The system 100 may also include one or more security devices, such as the video doorbell 132 and/or the video cameras 138A-B. The security devices 132, 138A-B may be located at any location along the premises 130. For example, the video doorbell 132 may be located adjacent to or near the point of entry 139 and the door 137 along an exterior of the premises 130. For example, the one or more video cameras 138A-B may be located along or near the exterior of the premises 130.

The video doorbell 132 may comprise a camera 134, a microphone 135, an activation device 136, a speaker, a transmitter, a receiver (or transceiver), and one or more processors. The activation device 136 may be a doorbell button, a doorbell switch, a doorbell touchpad, a capacitive sensor, a motion sensor, an audio sensor, an infrared sensor, or other similar device. For example, the video doorbell may be activated based on the use or triggering of the activation device 136. For example, a visitor may depress the activation device 136 to activate a doorbell chime, the camera 134, and the microphone 135 to begin recording the security data. The video doorbell 132 may be configured to record security data such as at least one of video data, via the camera 134, and audio data, via the microphone 135. The video doorbell 132 may be configured to launch, cause to launch, run, cause to be run, execute, cause to be executed, initiate, or cause to be initiated a communication session with the computing device 106 and send the security data, via the transmitter or transceiver, to the computing device 106 via the network 114 or another network. The video doorbell 132 may be configured to receive audio data, such as from the media device 120, via the receiver or transceiver, and output the audio data via the speaker of the video doorbell 132. For example, the audio data may comprise user voice data. For example the user voice data may be received by the media device 120 from one of the user devices (e.g., a voice-enabled remote control 122, mobile device 123, a voice assistant device, a smart speaker, a Bluetooth headset, etc.).

Each video camera 138A-B may comprise a camera, a microphone, an activation device, a speaker, a transmitter, a receiver (or transceiver), and one or more processors. The activation device may be a motion sensor, an audio sensor, an infrared sensor, or other similar device. For example, the video camera 138A-B may be activated based on the triggering of the activation device. For example, a person may pass within a viewing window of the video camera 138A-B and/or the activation device of the video camera 138A-B to activate the camera and the microphone to begin recording the security data. The video camera 138A-B may be configured to record security data, such as at least one of video data, via the camera, and audio data, via the microphone. The video camera 138A-B may be configured to launch, cause to launch, run, cause to be run, execute, cause to be executed, initiate, or cause to be initiated a communication session with the computing device 106 and send the security data, via the transmitter or transceiver, to the computing device 106 via the network 114 or another network. The video camera 138A-B may be configured to receive audio data, such as from the media device 120, via the receiver or transceiver, and output the audio data via the speaker of the video camera 138A-B. For example, the audio data may comprise user voice data. For example the audio data (e.g., user voice data) may be received by the media device 120 from one of the user devices (e.g., the voice-enabled remote control 122, mobile device 123, the voice assistant device, a smart speaker, a Bluetooth headset, etc.).

The system 100 may comprise one or more media device 120, 140A-C. Each media device 120, 140A-C may be a computing device and may be configured to receive one or more content items from the one or more content sources 104. Each media device 120, 140A-C may be configured to receive audio data from one or more user devices (e.g., the voice-enabled remote control 122, mobile device 123, the voice assistant device, a smart speaker, a Bluetooth headset, etc.). Each media device 120, 140A-C may be configured to receive at least a portion of the security data from the computing device 106. Each media device 120, 140A-C may be configured to send audio data to the computing device 102 and, based on the audio data, receive command instructions from the computing device 102 for executing a command related to display 121/television. Each media device 120, 140A-C may be configured to send audio data to one or more of the security devices (e.g., the video doorbell 132 or the one or more video cameras 138A-B) and/or the computing device 106.

Each media device 120, 140A-C may comprise a device configured to enable a display device 121 (e.g., a display, a television, a computer or other similar device) to output media (e.g., video data and/or audio data). For example, each media device 120, 140A-C may be configured to receive, decode, transcode, encode, send, and or otherwise process data and send data to, for example, the display device 121. Each media device 120, 140A-C may comprise one or more processors, transmitter, receiver, transceiver, a demodulator, decoder, frequency tuner, combinations thereof, and the like. Each media device 120, 140A-C may be directly connected to the network 114 or another network (e.g., for communications via in-band and/or out-of-band signals of a content delivery network) and/or connected to the network 114 via the gateway device 124 (e.g., for communications via a packet switched network). Each media device 120, 140A-C may implement one or more applications, such as content viewers, security applications, chat applications, telehealth applications, social media applications, news applications, gaming applications, content stores, electronic program guides, combinations thereof, and the like. Those skilled in the art will appreciate that the signal may be demodulated and/or decoded in a variety of equipment, including the gateway device 124, a computer, a TV, a monitor, or a satellite dish.

The system 100 may comprise the gateway device 124. The gateway device 124 may comprise a local gateway (e.g., router, modem, switch, hub, combinations thereof, and the like) configured to connect (or facilitate a connection (e.g., a communication session) between) a local area network (e.g., a LAN) to a wide area network (e.g., a WAN) such as the network 114. The gateway device 124 may be associated with the premises 130. The gateway device 124 may configured to receive incoming data (e.g., data packets or other signals) from the network 114 and route the data to one or more other devices associated with the premises 130 (e.g., the media device 120, the display 121, the user devices (e.g., the voice-enabled remote control 122, mobile device 123, the voice assistant device, the smart speaker, the Bluetooth headset, etc.), combinations thereof, and the like. The gateway device 124 may be configured to communicate with the network 114. The gateway device 124 may be configured for communication with the network 114 via a variety of protocols, such as IP, transmission control protocol, file transfer protocol, session initiation protocol, voice over IP (e.g., VoIP), combinations thereof, and the like. The gateway device 124, for a cable network, may be configured to facilitate network access via a variety of communication protocols and standards, such as Data Over Cable Service Interface Specification (DOCSIS).

The gateway device 124 may be configured to receive the audio data (e.g., user voice data) from the media device 120 and send the audio data to the computing device 102 and/or the computing device 106 via the network 114 or another network. The gateway device 124 may be configured to receive commands or code associated with one or more commands from the computing device 102 and/or security data from the computing device 106, via the network 114 or another network, and may send the received data to the media device 120. The gateway device 124 may be configured to receive audio data from the media device 120, via the network 114 or another network, and may send the received audio data to the one or more media devices 140A-C. The gateway device 124 may be configured to receive audio data from one or more of the media devices 140A-C, via the network 114 or another network, and may send the received audio data to the media device 120.

The system 100 may also comprise one or more user devices. For example, a user may receive content (e.g., audio data, video data, or audio/video data) from the network 114 on the user device. For example, the user device may send the audio data (e.g., user voice data) to the media device 120. The user device may be configured to communicate with the media device 120 via wireless communications. For example, the wireless communications may be one or more of Bluetooth, Bluetooth Low Energy, WiFi, radio frequency (RF), Zigbee, or another wireless communication protocol. The user device may be the voice-enabled remote control 122 or a mobile device 123 (e.g., a smart phone, a voice assistant device, a Bluetooth headset, a laptop computer, a tablet device, a computer station, a personal data assistant (PDA), a smart watch, smart glasses), a smart speaker, a portable media player, a combination thereof, or the like). The voice-enabled remote control may include a microphone within the body of the remote control 122 and may be configured to receive audio data (e.g., user voice data) from a user operating the remote control 122. The audio data may take the form of one or more of commands, requests, search queries, or general discussion. For example, the remote control 122 may include a button or switch to activate the microphone on the remote control. Once activated, the user may speak into the microphone to provide the audio data (e.g., the user voice data). Each of the mobile devices 123 may also be voice-enabled and may be configured to receive the user voice data in a similar or different manner than described above with regard to the remote control 122. The user device may communicate with a variety of gateways, such as the gateway 124.

Figure 2:
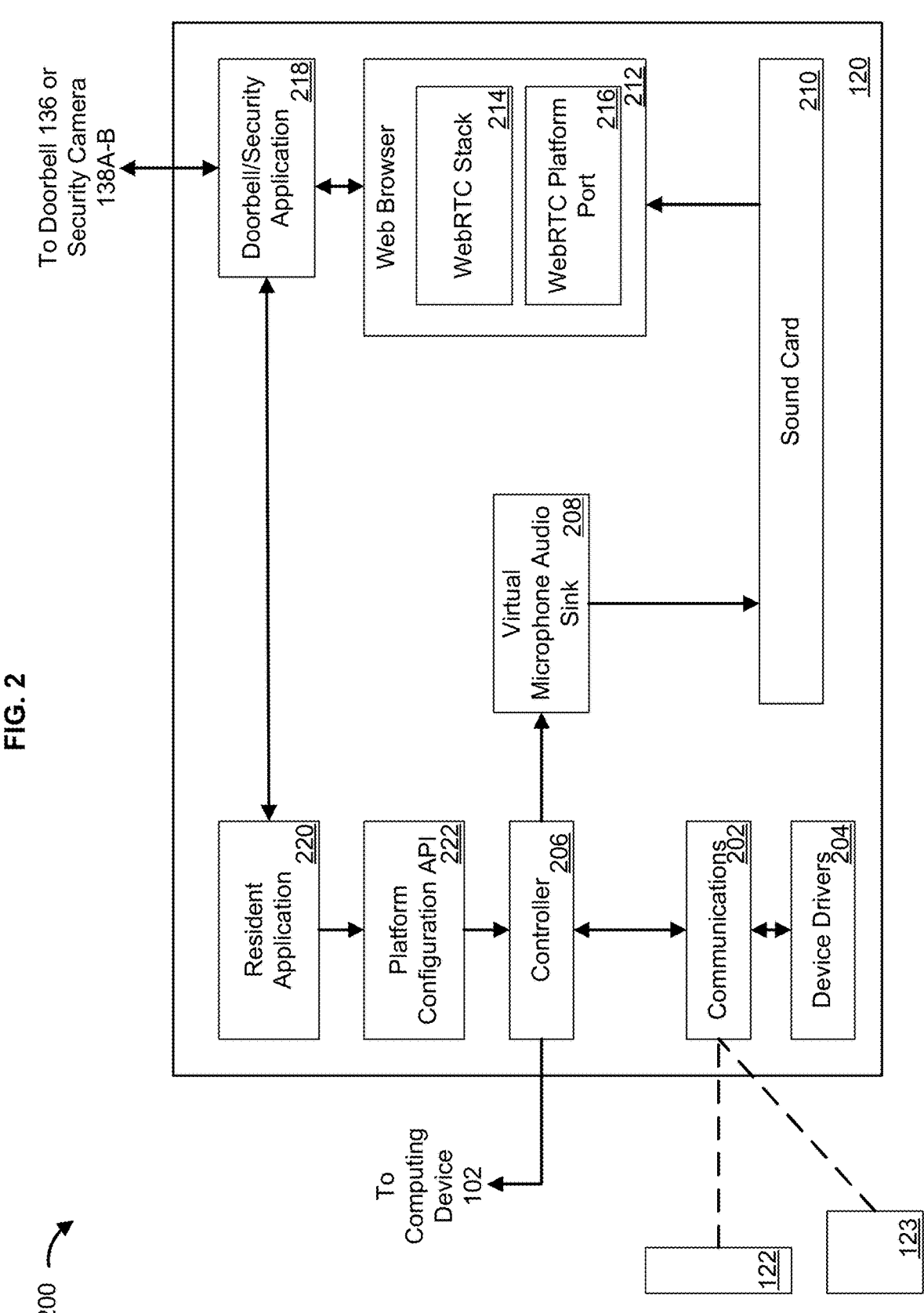
FIG. 2 shows an example media device architecture for the management of communications.

FIG. 2 is an example device architecture for the media device 120 for the management of communications between a user device (e.g., the voice-enabled remote control 122, mobile device 123, the voice assistant device, the smart speaker, the Bluetooth headset, etc.), the media device 120, and optionally other media devices 140A-C, the computing device 102, the computing device 106, and/or one or more of the security devices (e.g., video doorbell 132 and/or security cameras 138A-B).

The media device 120 may comprise a communications module 202. For example, the communications module 202 may comprise a hardware abstraction for receiving communications from one or more of the user devices (e.g., the voice-enabled remote control 122, mobile device 123, the voice assistant device, the smart speaker, the Bluetooth headset, etc.). For example, the user device (e.g., the voice-enabled remote control 122, mobile device 123, the voice assistant device, the smart speaker, the Bluetooth headset, etc.) may be configured to communicate with the media device 120 via wireless communications. For example, the wireless communications may be one or more of Bluetooth, Bluetooth Low Energy, WiFi, radio frequency (RF), Zigbee, or another wireless communication protocol. For example, the communications module 202 may be configured to receive non-verbal commands for adjusting or changing the content on a display device 121 (e.g., a display, a television, a computer or other similar device) associated with the media device 120. For example, the communications module 202 may be configured to receive audio data (e.g., user voice data) from the user device. The audio data may comprise one or more of a command, a request, a query or other instruction associated the user and with the content or the display device 121 outputting the content. For example, the audio data may comprise an instruction to raise the volume, lower the volume, change the channel, search for a channel, search for a content item (e.g., a movie, television show, or sporting event) or other similar commands or instructions. The audio data may comprise discussion data received from the user device. For example, the discussion data may be responsive to voice and/or video data received from one or more of the security devices (e.g., video doorbell 132 and/or security cameras 138A-B) or one or more of the other media devices 140A-C.

The media device 120 may comprise one or more device drivers 204. The device drivers 204 may comprise software and instructions for communicating with one or more of the user devices (e.g., the voice-enabled remote control 122, mobile device 123, the voice assistant device, the smart speaker, the Bluetooth headset, etc.). For example, the communications module 202 may access one of the one or more device drivers 204 based on the type of user device that is currently trying to communication with the media device.

The media device 120 may comprise a controller 206. The controller 206 may be configured to receive the audio data (e.g., the user voice data) from the user device via the communications module 202. The controller 206 may be communicably coupled to one or more processors of the media device 120. The controller 206 may be configured to evaluate the received audio data (e.g., from the user device)

and determine if the received audio data should be evaluated to determine a command/instruction associated with the media device 120 or display device 121 or if the audio data is associated with a communications application (e.g., a security application, a telehealth application, a chat application, a watch party application). The controller 206 may make the determination on how to route the audio data based on information (or the lack of information) provided by the resident application 220.

For example, the controller 206 may have a default instruction to determine that the received audio data is associated with a command for one of the media device 120 or display device 121 and forward the received audio data to the computing device 102. The controller 206 may, based on the default instruction, forward the audio data to the computing device 102 so that the audio data (e.g., user voice data) may be converted to text and the command or instruction in the audio data may be determined by the computing device 102. For example, the resident application 220 may notify or signal to the controller 206 that no communications applications are active. Based on the notification that not communications applications are active, the controller 206 may send the audio data to the computing device 102 so that the audio data may be converted to text and the command or instruction in the audio data may be determined by the computing device 102. For example, the resident application 220 may notify or signal to the controller 206 that a communications application is active. Based on the indication that the communications application is active, the controller 206 may route the received audio data to the communications application as discussed below.

The media device 120 may comprise a resident application 220. The resident application 220 may be configured to provide a user interface for the media device and optionally the display device 121. For example, the resident application 220 may be configured to generate and cause to be displayed a content guide, content search functions, and/or available applications (e.g., media applications, communications applications (e.g., security applications, telehealth applications, chat applications, watch party applications), streaming applications, etc.) for selection. The resident application 220 may be configured to communicate with the available applications and determine if one or more of the available applications has been selected and/or is in use by the media device 120. The resident application 220 may be configured to signal or notify the controller 206 that the one or more available application has been selected and/or is in use by the media device 120.

The media device 120 may comprise a platform configuration application programming interface (API) 222. The platform configuration API 222 may be configured to allow the resident application 220 to communicate with the controller 206. For example, the resident application 220 may use the platform configuration API 222 to communicate with the controller 206.

As discussed above, a user, via the user device, may launch, initiate, execute, or run a communications application or respond to a notification to connect, cause to connect, launch, cause to launch, run, cause to be run, execute, cause to be executed, initiate, or cause to be initiated a communication pathway via the communications application. For example, a user, via a user device, may select to activate, execute, run, initiate, or launch one of the available communications applications, such as the doorbell/security application 218, telehealth application, chat application, watch party application, etc. For example, the user may provide audio data or a non-verbal instruction to the user device (e.g., the voice-enabled remote control 122, mobile device 123, the voice assistant device, the smart speaker, the Bluetooth headset, etc.) to run, execute, activate, launch, or initiate one of the available communications applications. The resident application 220 may send a signal to the selected application to launch or start the selected application (e.g., the doorbell/security application 218). Similarly, launching or initiating other communications applications for chatting with one or more other users associated with the other media device 140A-C for telehealth, audio chatting, watch parties etc. may be similarly accomplished. Once the communications application (e.g., the doorbell/security application 218) is launched, the resident application 220 may notify the controller 206 to route audio data (e.g., user audio data) received from the user devices to the open communications application.

For example, the media device 120, via the doorbell/security application 218 or another communications application (e.g., telehealth, chat, watch party) may receive a notification of an activation associated with one or more of the security devices. For example, the activation may comprise a visitor activating or depressing the doorbell button, switch, or touchpad, or the security device detecting motion or sound. For other communications applications, the notification may be a request to initiate, run, begin, launch, or execute a chat session with the user via the user device and the media device 120. The doorbell/security application 218 or the other communications application to be opened may send a signal or notification to the resident application 220 indicating the received notification or activation and requesting instructions to open, initiate, or launch a communications pathway between the user device and the security device via the media device 120. For example, the user may accept the request (or provide an indication of acceptance of the request) based on an input at the user device (e.g., the voice-enabled remote control 122, mobile device 123, the voice assistant device, the smart speaker, the Bluetooth headset, etc.). For example, the input may comprise a button depressed by the user at the user device or the user providing a signal via audio data into the user device. For example, the signal may comprise audio data of the user stating "yes," "open," "accept," or the like.

The media device 120 may comprise a web browser 212. The web browser 212 may be associated with a WebRTC platform port 216 for receiving input data from the media device and outputting data received from a communications application to the media device 120. The web browser 212 may comprise a WebRTC stack 214. The WebRTC stack 214 may be configured to enable the web browser 212 to process and output voice, text, and/or video data received from the security devices (or for other communications applications, from one or more of the media devices 140A-C) via the web browser 212 to, for example, the display device 121.

For example, the doorbell/security application 218, or another communications application, may be configured to connect to, cause to connect to, launch, cause to launch, run, cause to be run, execute, cause to be executed, initiate, or cause to be initiated a communication session between one or more of the security devices (e.g., video doorbell 132 and/or security cameras 138A-B) and the media device 120, via the computing device 106 and the network 114 or another network. For example, the open or launched communications application (e.g., the doorbell/security application 218 may provide a user interface via the web browser 212 and send audio data and/or video data received from the communications application to the web browser to cause the web browser to output the audio data and/or video data at the display device 121. For example, the doorbell/security application 218 may be configured to receive security data (e.g., at least one of audio data and/or video data) from one or more of the security devices either directly from the security devices via the gateway 124 or via the computing device 106, the network 114 (or another network) and the gateway 124. The doorbell/security application 218 may be configured to output the received audio data and/or security data at the display device 121 via the web browser 212.

The media device 120 may comprise a virtual microphone audio sink 208 and a sound card 210. The virtual microphone audio sink 208 and the sound card 210 may be configured to provide audio data received from the user device (e.g., the voice-enabled remote control 122, mobile device 123, the voice assistant device, the smart speaker, the Bluetooth headset, etc.) to the open communications application (e.g., the doorbell/security application 218) via the web browser 212. For example, the audio sink 208 may allow audio data (e.g., user audio data) to be output through the sound card 210 to the doorbell/security application 218 (or another communications application) and output at the associated security device (or other media devices 140A-C for other communications applications). For example, when the controller 206 has been notified by the resident application 220 to route audio data (e.g., user audio data) received from the user devices to the open communications application, the controller 206, upon receiving the audio data from the user device and through the communications module 202, may send the audio data to the audio sink 208 for processing through the sound card 210.

Figure 3:
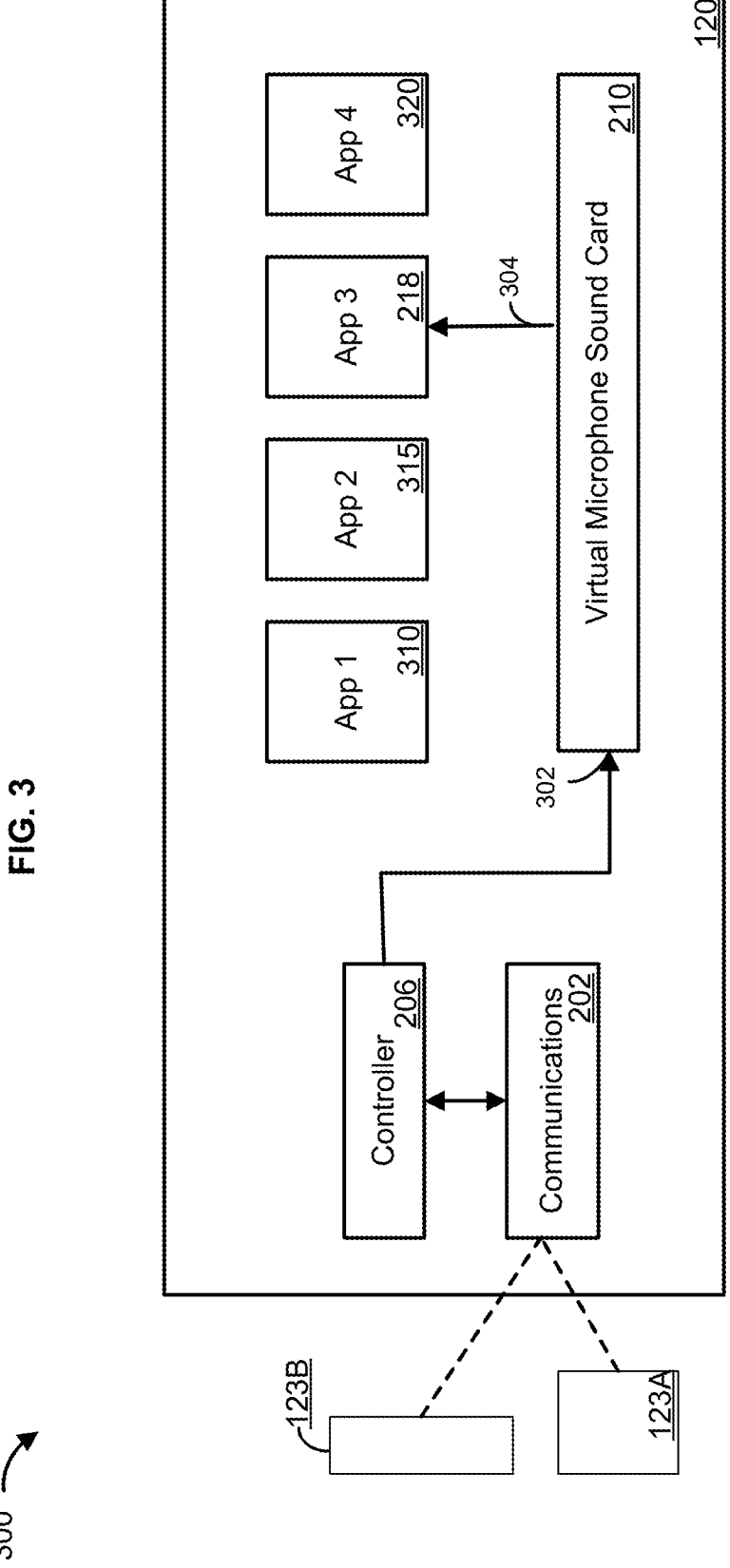
FIG. 3 shows a portion of an example media device architecture for the management of communications.

For example, the sound card 210 may be a virtual sound card (e.g., a sound card presenting via software in the media device 120. For example, the sound card 210 simulates a microphone virtually in the software of the media device by converting the received audio data from the user device (e.g., the user voice data) so that communications applications operating on the media device 120 can access the audio data as if the media device itself had a physical microphone. For example, the sound card 210 may be a virtual loop-back sound card. As shown in FIG. 3, the sound card 210 may form a full-duplex loopback virtual sound card. At a first portion of the sound card 210 the received audio data from the user device may be received at an audio input port 302 as if it is coming in from a physical microphone of the media device. At another portion of the sound card 210, the received audio data may be output through an audio output port 304 to the open communications application (e.g., the doorbell/security application 218, the telehealth application 310, the chat application 315, the watch party application 320, or the like). The loopback within the virtual sound card 210 may create, for example, two devices within the virtual sound card 210. Each of the devices can be used as either an audio playback or audio capture device. The portion of the sound card 210 associated with the audio input port 302, recognizes the audio data being received as being received from a microphone, even though the media device 120 may not include the microphone. The portion of the sound card 210 associated with the audio output port 304, recognizes the audio data going to a speaker (when it is initially being sent to the communications application operating on the web browser 212.

FIG. 4 shows a flowchart of an example method 400 for managing communications. The methods described in FIG. 4 may be completed by a computing device (e.g., the media device 120 or any other computing device described herein). While the method 400 of FIG. 4 will describe as being completed by the media device 120, this is for example purposes only, as all or any other portion of the method 400 may be completed by any other computing device described herein.

At 410, first audio data may be received via a first communication session. The first audio data may be received by the media device 120. For example, a user may speak into a microphone of a user device (e.g., the voice-enabled remote control 122, mobile device 123, the voice assistant device, the smart speaker, the Bluetooth headset, etc.). The user device may convert the spoken language into the first audio data. The user device may send the first audio data to the media device 120. For example, the first audio data may be sent to the media device 120 via a wireless communication, such as Bluetooth, BLE, WiFi, RF, Zigbee or any other wireless communication. For example, a controller 206 of the media device 120 may receive the first audio data from the user device via the communications module 202.

At 420, the first audio data may be determined to be associated with a command for one of the media device 120 or a display device 121. For example, the determination may be made by the media device 120. For example, the first audio data may be determined to be associated with a command for one of the media device 120 or the display device 121 based on a default instruction to determine that the first audio data is associated with a command for one of the media device 120 or display device 121. For example, the first audio data may be determined to be associated with a command for one of the media device 120 or the display device 121 based on an indication or notification that a communications application for the media device 120 is not open or launched. For example, the resident application 220 of the media device 120 may determine the status of the one or more communications applications for the media device. For example, the resident application may determine that the communications applications have not been opened or launched and may send a notification to the controller 206 indicating the status of the communications applications.

At 430, the first audio data may be sent for analysis. For example, the first audio data may be sent to a remote computing device. For example, the first audio data may be to the computing device 102, such as a cloud computing device. The computing device 102 may receive the first audio data. The computing device 102 may use a speech-to-text engine 108 to convert the first audio data to text data.

The computing device 102 may use a command engine 110 to analyze the converted text data to determine one or more commands or actions being requested in the received audio data. For example, the command engine 110 may receive text that states "change to channel 38". The command engine 110 may compare one or more of the words or phrases in the text to a stored database of commands or actions to determine the command or action being requested. For example, the command engine 110 may parse the text into one or more words or phrases and compare the parsed portions of the text to the stored database of commands or actions. The command engine 110 may determine that a user associated with media device 120 and/or user device wishes to change the channel shown on the display device 121 to channel 38. The computing device 102 (e.g., the command engine 110) may determine the code or instructions to provide to the media device 120 in order to change the channel output on the display device 121 from the current channel to channel 38. The command engine 110 or the computing device 102 may send the code or instructions to the media device 120.

For example, the media device 120 may receive the code or instructions associated with the requested command in the first audio data and may execute the command on the media device 120 and/or cause the command to be executed on the display device 121. Examples of commands may include, but are not limited to, instruction to raise the volume, lower the volume, turn on display device 121, turn off display device 121, change the channel, search for a channel, search for a content item (e.g., a movie, television show, or sporting event) or other similar commands or instructions. The first communication session may then be closed or otherwise terminated.

A visitor (e.g., another user) may approach one of the security devices (e.g., video doorbell 132 and/or security cameras 138A-B) on the premises 130. For example, the visitor may activate one or more of the security devices. For example activating the security device may comprise waking the security device or a portion of the security device from a sleep state. For example, if the security device is a video doorbell 132, the visitor may activate the video doorbell 132 by pressing or engaging the activation device 136 (e.g., a doorbell button, a doorbell switch, a doorbell touchpad, a capacitive sensor, etc.) or triggering a motion sensor or audio sensor associated with the video doorbell 132. For example, if the security device is a security camera 138A-B, the visitor may activate the video camera 138A-B by triggering a motion sensor or audio sensor associated with the particular video camera 138A-B. For example, a visitor activating the security device may, in the case where the security device is a video doorbell 132, activate a doorbell chime, the camera 134, and the microphone 135 to begin recording the security data and in the case where the security device is a security camera 138A-B, activate the camera and microphone associated with the particular security camera 138A-B. Each security device may be configured to record security data such as at least one of video data, via the camera, and audio data, via the microphone.

The media device 120 may receive a notification of an activation associated with one or more of the security devices. For example, the security device may send the activation notification to the computing device 106 via the network 114 or another network. For example, the activation notification may include security data (e.g., one or more of audio data or video data) recorded at the particular security device. The computing device 106 may evaluate the metadata associated with the notification and/or the security data and determine a user or location associated with the notification or security data. The computing device may compare the user and/or location information to device data 109 in the computing device 106, to determine the media device 120, network address, or location of the media device 120. The computing device 106 may send the notification and, if included, the security data to the media device 120 associated with the same user and or associated with the security devices.

The media device 120 may receive the notification of activation of the security device. The doorbell/security application 218 may send a signal or notification to the resident application 220 indicating the received notification of activation and requesting instructions to open, launch, execute, or initiate a communications pathway between the user device and the security device via the media device 120. The resident application 220 may display a message associated with the notification of activation on the display device 121 and request instructions for initiating the communication pathway between the user device and the security device. For example, the user may accept the request (or provide an indication of acceptance of the request) based on an input at the user device (e.g., the voice-enabled remote control 122, mobile device 123, the voice assistant device, the smart speaker, the Bluetooth headset, etc.). For example, the input may comprise a button depressed by the user at the user device or the user providing a signal via audio data into the user device. For example, the signal may comprise audio data of the user stating "yes," "open," "accept," or the like.

The security device (e.g., video doorbell 132 and/or security cameras 138A-B) may record security data (e.g., security audio data and/or security video data). For example, the security audio data may comprise voice data from the visitor received via the microphone 135. Once the communications pathway between the user device and the security device, via the media device 120, is opened, the security data may be sent by the security device to the computing device 106 via the network 114 and then to the media device 120 via the network 114 or the security data may be sent by the security device to the media device 120 via the gateway 124. The security data may be received by the media device 120 (e.g., by the doorbell/security application 218). The doorbell/security application 218 may output or cause to be output the security data at the media device and/or the associated display device 121. For example, the doorbell/security application 218 may cause the security data to be output via the web browser 212. For example, the display device 121 may output both security audio data and security video data of the security data.

At 440, second audio data may be received via the second communication session. The second audio data may be received by the media device 120. For example, a user may speak into the microphone of the user device (e.g., the voice-enabled remote control 122, mobile device 123, the voice assistant device, the smart speaker, the Bluetooth headset, etc.). For example the second audio data may be received prior to or in response to the all or a portion of the security data caused to be displayed at the display device 121.

The user device may convert the spoken language into the second audio data. The user device may send the second audio data to the media device 120. For example, the second audio data may be sent to the media device 120 via wireless communication, such as Bluetooth, BLE, WiFi, RF, Zigbee or any other wireless communication. For example, the controller 206 of the media device 120 may receive the second audio data from the user device via the communications module 202.

At 450, the second audio data may be determined to be associated with a security device. For example, the determination may be made by the media device 120 (e.g., the controller 206). For example, when the doorbell/security application 218 is launched and the user accepts the request (or provides an indication of acceptance of the request) to open a communication pathway between the user device and the security device, the resident application 220 of the media device 120 can determine that one of the communications applications (e.g., the doorbell security application 218) has launched and is active. The resident application 220 may send a signal or notification to the controller 206 of the media device 120 to route audio data (e.g., user audio data) received from the user devices to the open communications application (e.g., the doorbell/security application 218). For example, based on the open communications application being the doorbell/security application 218, the media device 120 (e.g., the controller 206) may determine that the second audio data is associated with one or more of the security devices.

At 460, the second audio data may be sent to the security device. For example, the second audio data may be sent by the media device 120 and received by one or more of the security devices (e.g., the video doorbell 132 and/or security cameras 138A-B). For example, while the doorbell/security application 218 is in use, the second audio data may be sent directly from the media device 120 to the one or more security devices via the doorbell/security application 218. For example, while the doorbell/security application 218 is in use, the second audio data may be sent to the one or more security devices via the gateway 124, the network 114, and the second computing device 106 via the doorbell/security application 218. For example, the second audio data may be sent to the one or more security devices via the gateway 124 and then to the particular security device. For example, the second audio data may be sent to the one or more security devices based on a determination that the second audio data is associated with at least one of the security devices.

For example, upon receiving the second audio data from the user device (e.g., the voice-enabled remote control 122, mobile device 123, the voice assistant device, the smart speaker, the Bluetooth headset, etc.), the controller 206 may send the second audio data to the audio sink 208 for processing through the virtual sound card 210. The virtual sound card 210 may receive the second audio data and act as a virtual microphone for the media device 120. The virtual sound card 210 may send the second audio data to the doorbell/security application 218 via the web browser 212. The doorbell/security application may send the received second audio data to the one or more security devices either directly, via the gateway 124 or via the gateway 124, the network 114, and the computing device 106.

The one or more security devices (e.g., the video doorbell 132 and/or security cameras 138A-B) may receive the second audio data (e.g., via the transceiver of the security device). The one or more security devices may output the second audio data at the security device (e.g., via a speaker associated with the particular security device of the one or more security devices).

While the second communication session and the communication pathway between the user device (e.g., the voice-enabled remote control 122, mobile device 123, the voice assistant device, the smart speaker, the Bluetooth headset, etc.) and the one or more security devices (e.g., video doorbell 132 and/or security cameras 138A-B) remain open and active, security data can continue to be sent by the security devices to the media device 120 for output on the associated display device 121 and additional audio data may be received by the media device from the user device and routed to the one or more security devices to be output at the one or more security devices.

The second communication session, and thus the communication pathway between the user device and the one or more security devices, may be terminated. For example the communication session may be terminated by one or more of the media device 120, the user device (e.g., the voice-enabled remote control 122, mobile device 123, the voice assistant device, the smart speaker, the Bluetooth headset, etc.), or the security device (e.g., the video doorbell 132 and/or security cameras 138A-B). For example, the second communication session may terminate upon the expiration of a timeout timer. The timeout timer may be a threshold amount of time during which no audio data or security data is being passed from one device to another during the second communication session. For example, the second communication session may terminate based on a verbal or non-verbal command received by the media device 120 from the user device. For example, the user may press a button on the user device or submit a voice command to close the doorbell/security application 218.

The resident application 220, based on the second communication session or the communication pathway being terminated, may send a notification or instruction to the controller 206 of the media device that there are no communication applications open. Based on the notification from the resident application 220, the controller 206 may revert back to sending all received audio data from the user device to the computing device 102 to determine the command or instruction requested in the received audio data.

Figure 5:
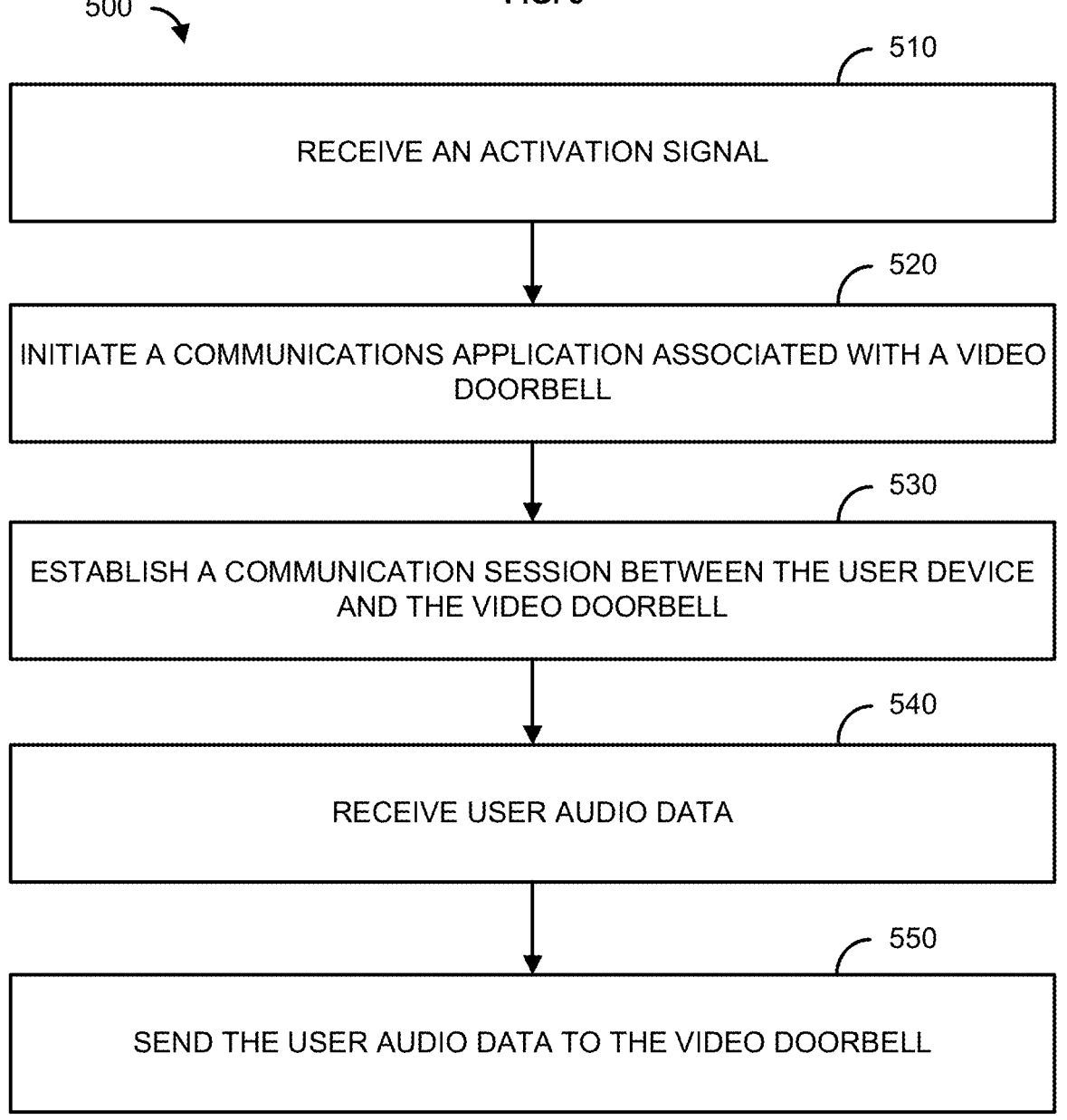
FIG. 5 shows a flowchart of an example method for managing communications.

FIG. 5 shows a flowchart of an example method 500 for managing communications. The methods described in FIG. 5 may be completed by a computing device (e.g., the media device 120 or any other computing device described herein). While the method 500 of FIG. 5 will describe as being completed by the media device 120, this is for example purposes only, as all or any other portion of the method 500 may be completed by any other computing device described herein.

A visitor (e.g., another user) may approach the video doorbell 132 on the premises 130. For example, the visitor may activate the video doorbell 132. For example activating the video doorbell 132 may comprise waking the video doorbell 132 or a portion of the video doorbell 132 from a sleep state. For example, the visitor may activate the video doorbell 132 by pressing or engaging the activation device 136 (e.g., a doorbell button, a doorbell switch, a doorbell touchpad, a capacitive sensor, etc.) or triggering a motion sensor or audio sensor associated with the video doorbell 132. For example, activating the video doorbell 132 may cause the video doorbell 132 to activate a doorbell chime, the camera 134, and the microphone 135 to begin recording the security data. For example, the video doorbell 132 may be configured to record security data such as video data, via the camera, and audio data, via the microphone.

At 510, an activation signal may be received. For example, the activation signal (e.g., a notification that a visitor is at the video doorbell) may be associated with the video doorbell 132. For example, the activation signal may be received by the media device 120. For example, the video doorbell 132 may send the activation signal to the computing device 106 via the network 114 or another network. For example, the activation signal may include security data (e.g., one or more of audio data or video data) recorded at the video doorbell 132. The computing device 106 may evaluate the metadata associated with the notification and/or the security data and determine a user or location associated with the notification or security data. The computing device 106 may compare the user and/or location information to device data 109 at the computing device 106, to determine the media device 120, network address, or location of the media device 120. The computing device 106 may send the activation signal and, if included, the security data to the media device 120 associated with the same user and or associated with the video doorbell 132 via the network 114. The media device 120 may receive the activation signal of the video doorbell 132 from the computing device 106.

At 520, a communications application may be initiated. For example, initiating the communications application may comprise launching the communications application or causing the communications application to be launched. For example, initiating the communications application may comprise running the communications application or causing the communications application to be run. For example, initiating the communications application may comprise executing the communications application or causing the communications application to be executed.

For example, the communications application may be initiated, run, executed, or launched by the media device 120. For example, the media device 120 may determine which communications application to initiate, run, execute, or launch. For example, determining which communications application to initiate, run, execute, or launch may be based on the activation signal received by the media device 120. For example, the media device 120 may determine that the activation signal received is for (or ultimately from) the video doorbell 132. Based on this determination, the media device 120 may determine that the communications application to initiate, run, execute, or launch is the doorbell/security application 218. The resident application 220, or another portion of the media device 120 may notify or send an instruction to the doorbell/security application 218 to open or launch.

At 530, a communication session between the user device and the video doorbell may be established. For example, establishing the communications session may comprise launching the communications session or causing the communications session to be launched. For example, establishing the communications session may comprise running the communications session or causing the communications session to be run. For example, establishing the communications session may comprise executing the communications session or causing the communications session to be executed.

For example, the communication session may be established by the media device 120. For example, the media device 120 (e.g., the resident application 220) may determine the communications application (e.g., the doorbell/security application 218) has initiated, run, been executed, or launched and is open; is launching, running, executing; or has a request to be initiated, executed, run, or launched. The determination may be based on the received activation signal. The resident application 220 of the media device 120 may retrieve or generate a notification of the received activation signal, a notification of a communication request associated with the activation signal or audio data from the video doorbell 132, and/or a request for instructions to open or establish a communication session between the user device and the video doorbell 132 via the media device 120. The resident application 220 may display or cause to be displayed a message associated with the activation signal on the display device 121 and request instructions for establishing the communication session between the user device and the video doorbell 132. For example, the user may accept the request (or provide an indication of acceptance of the request) based on an input at the user device (e.g., the voice-enabled remote control 122, mobile device 123, the voice assistant device, the smart speaker, the Bluetooth headset, etc.). For example, the input may comprise a button depressed by the user at the user device or the user providing a signal via audio data into the user device. For example, the signal may comprise audio data of the user stating "yes," "open," "accept," or the like.

The video doorbell 132 may record security data (e.g., security audio data and/or security video data). For example, the security audio data may comprise voice data from the visitor received via the microphone 135. For example, the security video data may comprise video data received from the camera 134. For example, the security video data may comprise one or more of video and still pictures. Once the communications session between the user device and the security device, via the media device 120, is opened, the security data may be sent by the video doorbell 132 to the computing device 106 via the network 114 and then to the media device 120 via the network 114 or the security data may be sent by the video doorbell 132 to the media device 120 via the gateway 124. The security data may be received by the media device 120 (e.g., by the doorbell/security application 218). The doorbell/security application 218 may output or cause to be output the security data at the media device 120 and/or the associated display device 121. For example, the doorbell/security application 218 may cause the security data to be output via the web browser 212. For example, the display device 121 may output both security audio data and security video data of the security data.

At 540, user audio data may be received. The user audio data may be received by the media device 120 from a user device. For example, a user may speak into the microphone of the user device (e.g., the voice-enabled remote control 122, mobile device 123, the voice assistant device, the smart speaker, the Bluetooth headset, etc.). For example the audio data may be received prior to or in response to the all or a portion of the security data caused to be displayed at the display device 121.

The user device may convert the spoken language into the audio data. The user device may send the audio data to the media device 120. For example, the audio data may be sent to the media device 120 via wireless communication, such as Bluetooth, BLE, WiFi, RF, Zigbee or any other wireless communication. For example, the controller 206 of the media device 120 may receive the audio data from the user device via the communications module 202.

For example, the audio data may be determined to be associated with the video doorbell 132. For example, the determination may be made by the media device 120 (e.g., the controller 206). For example, when the doorbell/security application 218 is launched and the user accepts the request to open a communication session between the user device and the security device, the resident application 220 of the media device 120 can determine that one of the communications applications (e.g., the doorbell security application 218) has launched and is active. The resident application 220 may send a signal or notification to the controller 206 of the media device 120 to route the audio data (e.g., user audio data) received from the user devices to the open communications application (e.g., the doorbell/security application 218). For example, based on the open communications application being the doorbell/security application 218, the media device 120 (e.g., the controller 206) may determine that the audio data is associated with the video doorbell 132.

At 550, the user audio data may be sent to the video doorbell 132. For example, the user audio data may be sent by the media device 120 and received by the video doorbell 132. For example, while the doorbell/security application 218 is in use, the user audio data may be sent directly from the media device 120 to the video doorbell 132 via the doorbell/security application 218. For example, while the doorbell/security application 218 is in use, the user audio data may be sent to the video doorbell 132 via the gateway 124, the network 114, and the second computing device 106. For example, while the doorbell/security application 218 is in use, the user audio data may be sent to the video doorbell 132 via the gateway 124. For example, the user audio data may be sent to the video doorbell 132 based on a determination that the user audio data is associated with the video doorbell 132 (which may be based on the fact that the doorbell/security application 218 is currently in use).

For example, upon receiving the user audio data from the user device (e.g., the voice-enabled remote control 122, mobile device 123, the voice assistant device, the smart speaker, the Bluetooth headset, etc.), the controller 206 may send the user audio data to the audio sink 208 for processing through the virtual sound card 210. The virtual sound card 210 may receive the user audio data and act as a virtual microphone for the media device 120. The virtual sound card 210 may send the user audio data to the doorbell/ security application 218 via the web browser 212. The doorbell/security application 218 may send the received user audio data to the video doorbell 132 either directly, via the gateway 124 or via the gateway 124, the network 114, and the computing device 106.

The video doorbell 132 may receive the user audio data (e.g., via the transceiver of the security device). The video doorbell 132 may output the user audio data at the video doorbell 132 (e.g., via a speaker associated with the video doorbell 132).

While the communication session and the communication pathway between the user device (e.g., the voice-enabled remote control 122, mobile device 123, the voice assistant device, the smart speaker, the Bluetooth headset, etc.) and the video doorbell 132 remain open and active, security data can continue to be sent by the video doorbell 132 to the media device 120 for output on the associated display device 121 and additional audio data may be received by the media device from the user device and routed to the video doorbell 132 to be output at the video doorbell 132.

The communication session, and thus the communication pathway between the user device and the video doorbell 132, may be terminated. For example the communication session may be terminated by one or more of the media device 120, the user device (e.g., the voice-enabled remote control 122, mobile device 123, the voice assistant device, the smart speaker, the Bluetooth headset, etc.), or the video doorbell 132. For example, the communication session may terminate upon the expiration of a timeout timer. The timeout timer may be a threshold amount of time during which no audio data or security data is being passed from one device to another during the communication session. For example, the communication session may terminate based on a verbal or non-verbal command received by the media device 120 from the user device. For example, the user may press a button on the user device or submit a voice command to close the doorbell/security application 218.

The resident application 220, based on the communication session or the communication pathway being terminated, may send a notification or instruction to the controller 206 of the media device that there are no communication applications open. Based on the notification from the resident application 220, the controller 206 may revert back to sending all received audio data from the user device to the computing device 102 to determine the command or instruction requested in the received audio data.

Figure 6:
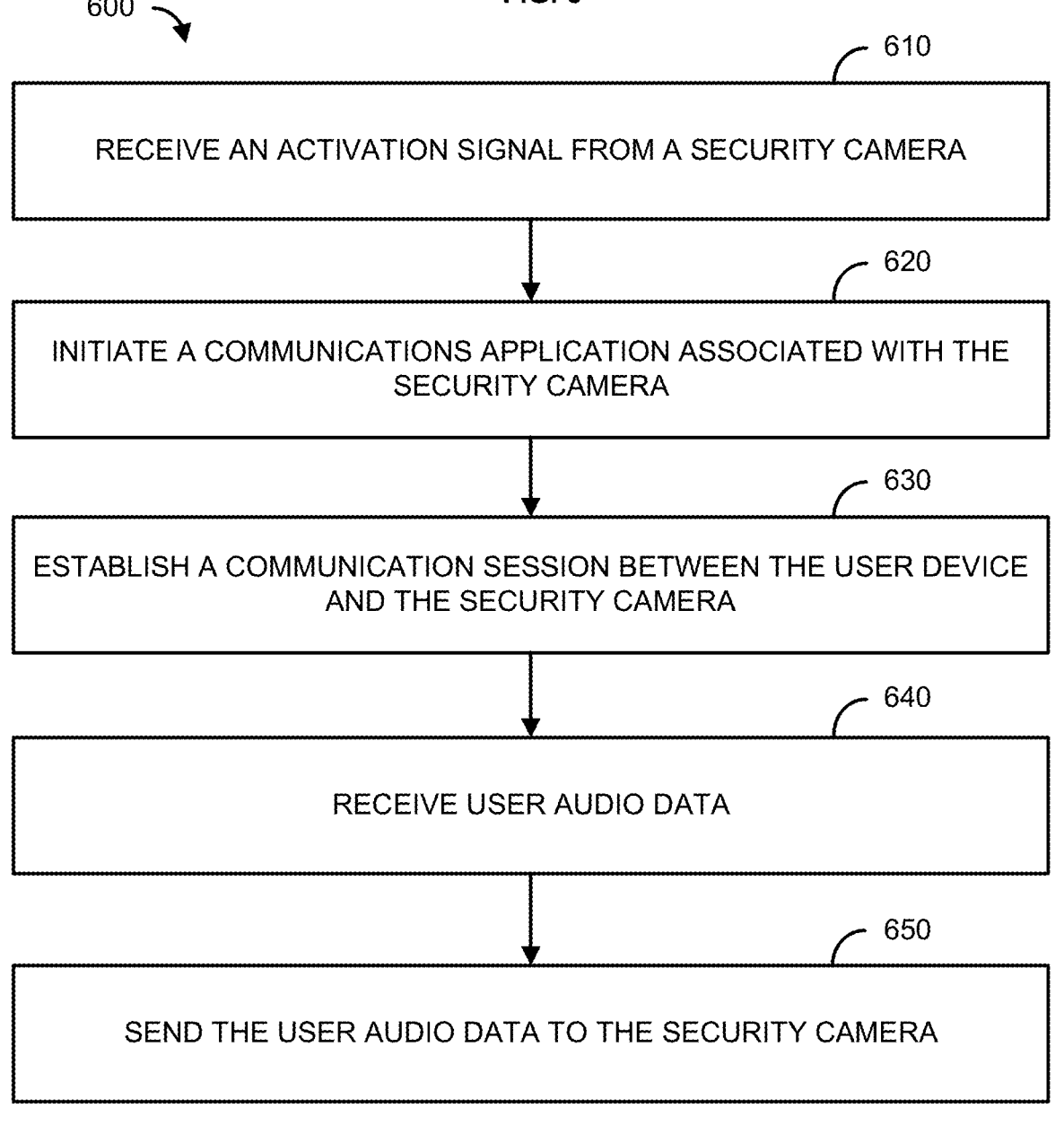
FIG. 6 shows a flowchart of an example method for managing communications.

FIG. 6 shows a flowchart of an example method 600 for managing communications. The methods described in FIG. 6 may be completed by a computing device (e.g., the media device 120 or any other computing device described herein). While the method 600 of FIG. 6 will describe as being completed by the media device 120, this is for example purposes only, as all or any other portion of the method 600 may be completed by any other computing device described herein.

A visitor (e.g., another user) may approach or be within a viewing window of a security camera 138A-B on the premises 130. For example, the visitor may activate the security camera 138A-B. For example activating the security camera 138A-B may comprise waking the security camera 138A-B or a portion of the security camera 138A-B from a sleep state. For example, the visitor may activate the security camera 138A-B by triggering a motion sensor or audio sensor associated with the security camera 138A-B. For example, activating the security camera 138A-B may cause the security camera 138A-B to activate a camera and a microphone associated with the security camera 138A-B to begin recording security data. For example, the security camera 138A-B may be configured to record security data such as video data, via the camera, and audio data, via the microphone.

At 610, an activation signal may be received. For example, the activation signal (e.g., a notification that a visitor has triggered or awaken the security camera 138A-B) may be associated with the security camera 138A-B. For example, the activation signal may be received by the media device 120. For example, the security camera 138A-B may send the activation signal to the computing device 106 via the network 114 or another network. For example, the activation signal may include security data (e.g., one or more of audio data or video data) recorded at the security camera 138A-B. The computing device 106 may evaluate the metadata associated with the notification and/or the security data and determine a user or location associated with the notification or security data. The computing device 106 may compare the user and/or location information to device data 109 at the computing device 106, to determine the media device 120, network address, or location of the media device 120. The computing device 106 may send the activation signal and, if included, the security data to the media device 120 associated with the same user and or associated with the security camera 138A-B via the network 114. The media device 120 may receive the activation signal of the security camera 138A-B from the computing device 106.

At 620, a communications application may be initiated. For example, initiating the communications application may comprise launching the communications application or causing the communications application to be launched. For example, initiating the communications application may comprise running the communications application or causing the communications application to be run. For example, initiating the communications application may comprise executing the communications application or causing the communications application to be executed.

For example, the communications application may be initiated, run, executed, or launched by the media device 120. For example, the media device 120 may determine which communications application to initiate, run, execute, or launch. For example, determining which communications application to initiate, run, execute, or launch may be based on the activation signal received by the media device 120. For example, the media device 120 may determine that the activation signal received is for (or ultimately from) the security camera 138A-B. Based on this determination, the media device 120 may determine that the communications application to initiate, run, execute, or launch is the doorbell/ security application 218. The resident application 220, or another portion of the media device 120 may notify or send an instruction to the doorbell/security application 218 to initiate, run, execute, or launch.

At 630, a communication session between the user device and the security camera 138A-B may be established. For example, establishing the communications session may comprise launching the communications session or causing the communications session to be launched. For example, establishing the communications session may comprise running the communications session or causing the communications session to be run. For example, establishing the communications session may comprise executing the communications session or causing the communications session to be executed.

For example, the communication session may be established by the media device 120. For example, the media device 120 (e.g., the resident application 220) may determine the communications application (e.g., the doorbell/security application 218) has initiated, run, executed, or launched and is open; is executing, running, initiating, or launching; or has a request to be initiated, executed, run, or launched. The determination may be based on the received activation signal. The resident application 220 of the media device 120 may retrieve or generate a notification of the received activation signal, a notification of a communication request associated with the activation signal or audio data from the security camera 138A-B, and/or a request for instructions to open or establish a communications session between the user device and the security camera 138A-B via the media device 120. The resident application 220 may display or cause to be displayed a message associated with the activation signal on the display device 121 and request instructions for initiating the communication session between the user device and the security camera 138A-B. For example, the user may accept the request (or provide an indication of acceptance of the request) based on an input at the user device (e.g., the voice-enabled remote control 122, mobile device 123, the voice assistant device, the smart speaker, the Bluetooth headset, etc.). For example, the input may comprise a button depressed by the user at the user device or the user providing a signal via audio data into the user device. For example, the signal may comprise audio data of the user stating "yes," "open," "accept," or the like.

The security device 138A-B may record security data (e.g., security audio data and/or security video data). For example, the security audio data may comprise voice data from the visitor received via the microphone associated with the security camera 138A-B. For example, the security video data may comprise video data received from the camera associated with the security camera 138A-B. For example, the security video data may comprise one or more of video and still pictures. Once the communications session between the user device and the security camera 138A-B, via the media device 120, is opened, the security data may be sent by the security camera 138A-B to the computing device 106 via the network 114 and then to the media device 120 via the network 114 or the security data may be sent by the security camera 138A-B to the media device 120 via the gateway 124. The security data may be received by the media device 120 (e.g., by the doorbell/security application 218). The doorbell/security application 218 may output or cause to be output the security data at the media device 120 and/or the associated display device 121. For example, the doorbell/security application 218 may cause the security data to be output via the web browser 212. For example, the display device 121 may output both security audio data and security video data of the security data.

At 640, user audio data may be received. The user audio data may be received by the media device 120 from a user device. For example, a user may speak into the microphone of the user device (e.g., the voice-enabled remote control 122, mobile device 123, the voice assistant device, the smart speaker, the Bluetooth headset, etc.). For example the audio data may be received prior to or in response to the all or a portion of the security data caused to be displayed at the display device 121.

The user device may convert the spoken language into the audio data. The user device may send the audio data to the media device 120. For example, the audio data may be sent to the media device 120 via wireless communication, such as Bluetooth, BLE, WiFi, RF, Zigbee or any other wireless communication. For example, the controller 206 of the media device 120 may receive the audio data from the user device via the communications module 202.

For example, the audio data may be determined to be associated with the security camera 138A-B. For example, the determination may be made by the media device 120 (e.g., the controller 206). For example, when the doorbell/security application 218 is launched and the user accepts the request to open a communication session between the user device and the security camera 138A-B, the resident application 220 of the media device 120 can determine that one of the communications applications (e.g., the doorbell security rity application 218) has launched and is active. The resident application 220 may send a signal or notification to the controller 206 of the media device 120 to route the audio data (e.g., user audio data) received from the user devices to the open communications application (e.g., the doorbell/security application 218). For example, based on the open communications application being the doorbell/security application 218, the media device 120 (e.g., the controller 206) may determine that the audio data is associated with the security camera 138A-B.

At 650, the user audio data may be sent to the triggered security camera 138A-B. For example, the user audio data may be sent by the media device 120 and received by the security camera 138A-B. For example, while the doorbell/security application 218 is in use, the user audio data may be sent directly from the media device 120 to the triggered security camera 138A-B via the doorbell/security application 218. For example, while the doorbell/security application 218 is in use, the user audio data may be sent to the security camera 138A-B via the gateway 124, the network 114, and the second computing device 106. For example, while the doorbell/security application 218 is in use, the user audio data may be sent to the security camera 138A-B via the gateway 124. For example, the user audio data may be sent to the security camera 138A-B based on a determination that the user audio data is associated with the security camera 138A-B (which can be determined based on the doorbell/security application 218 being in use by the media device 120).

For example, upon receiving the user audio data from the user device (e.g., the voice-enabled remote control 122, mobile device 123, the voice assistant device, the smart speaker, the Bluetooth headset, etc.), the controller 206 may send the user audio data to the audio sink 208 for processing through the virtual sound card 210. The virtual sound card 210 may receive the user audio data and act as a virtual microphone for the media device 120. The virtual sound card 210 may send the user audio data to the doorbell/security application 218 via the web browser 212. The doorbell/security application 218 may send the received user audio data to the security camera 138A-B either directly, via the gateway 124 or via the gateway 124, the network 114, and the computing device 106.

The security camera 138A-B may receive the user audio data (e.g., via the transceiver of the security camera 138A-B). The security camera 138A-B may output the user audio data at the security camera 138A-B (e.g., via a speaker associated with the security camera 138A-B).

While the communication session and the communication pathway between the user device (e.g., the voice-enabled remote control 122, mobile device 123, the voice assistant device, the smart speaker, the Bluetooth headset, etc.) and the security camera 138A-B remain open and active, security data can continue to be sent by the security camera 138A-B to the media device 120 for output on the associated display device 121 and additional audio data may be received by the media device from the user device and routed to the security camera 138A-B to be output at the security camera 138A-B.

The communication session, and thus the communication pathway between the user device and the security camera 138A-B, may be terminated. For example the communication session may be terminated by one or more of the media device 120, the user device (e.g., the voice-enabled remote control 122, mobile device 123, the voice assistant device, the smart speaker, the Bluetooth headset, etc.), or the security camera 138A-B. For example, the communication session may terminate upon the expiration of a timeout timer. The timeout timer may be a threshold amount of time during which no audio data or security data is being passed from one device to another during the communication session. For example, the communication session may terminate based on a verbal or non-verbal command received by the media device 120 from the user device. For example, the user may press a button on the user device or submit a voice command to close the doorbell/security application 218.

The resident application 220, based on the communication session or the communication pathway being terminated, may send a notification or instruction to the controller 206 of the media device that there are no communication applications open. Based on the notification from the resident application 220, the controller 206 may revert back to sending all received audio data from the user device to the computing device 102 to determine the command or instruction requested in the received audio data.

Figure 7:
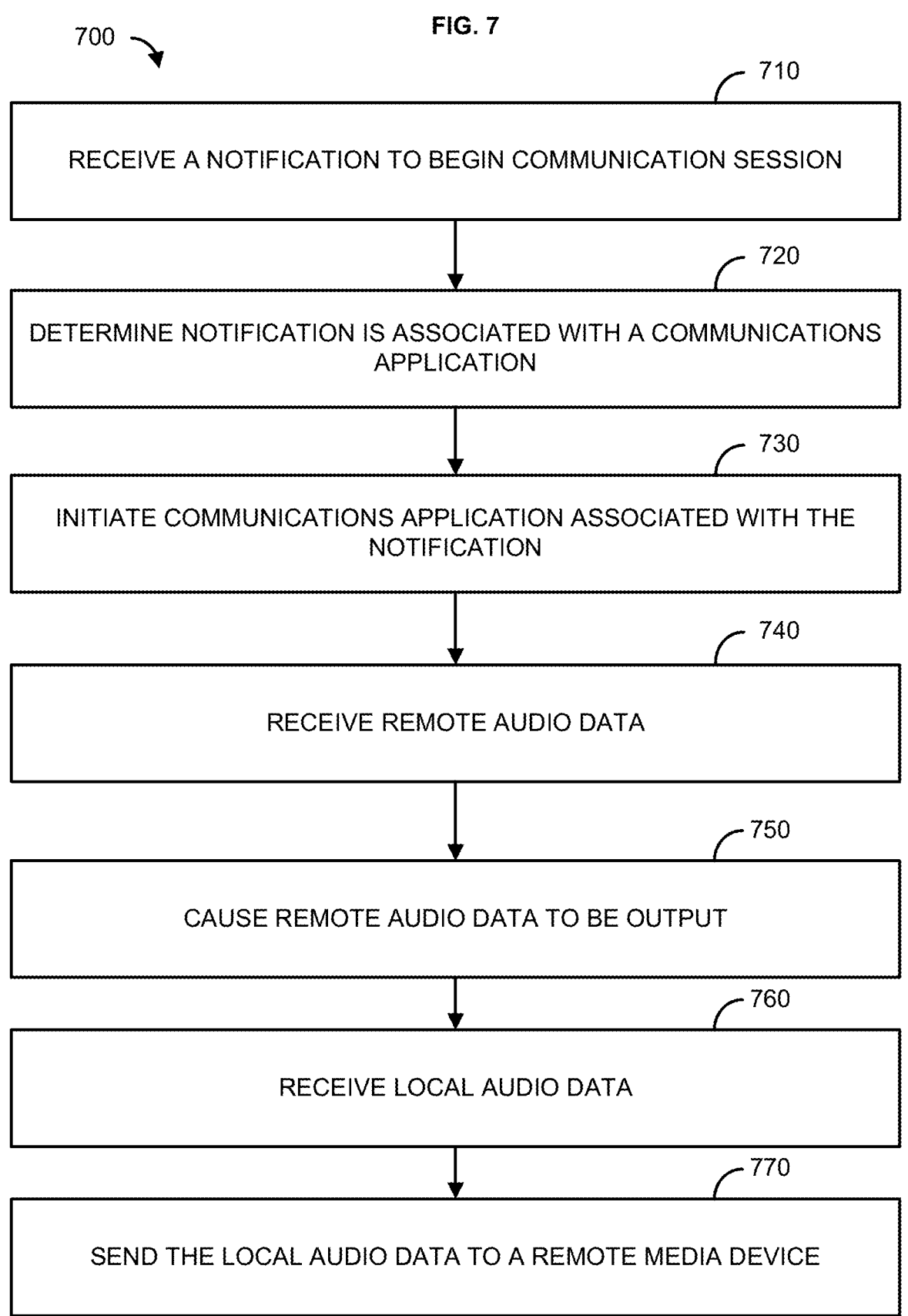
FIG. 7 shows a flowchart of an example method of managing communications.

FIG. 7 shows a flowchart of an example method 700 for managing communications. The methods described in FIG. 7 may be completed by a computing device (e.g., the media device 120 or any other computing device described herein). While the method 700 of FIG. 7 will describe as being completed by the media device 120, this is for example purposes only, as all or any other portion of the method 700 may be completed by any other computing device described herein.

A remote user (e.g., a user located at a different premises than the premises 130 of the media device 120) may access one of the remote media devices 140A-C. For example, the remote user may access the remote media device 140A using another user device (e.g., another voice-enabled remote control, another mobile device, another voice assistant device, another smart speaker, another Bluetooth headset, etc.). The remote user may request to establish (e.g., initiate, cause to initiate, run, cause to be run, execute, cause to be executed, launch, or cause to be launched, etc.) a communication session with another media device (e.g., the media device 120). For example, the communication session may be one of a chat session, a watch party, or a telehealth review. For example, the remote user may launch a communications application that corresponds to the communication session desired at the remote media device 140A. For example, if the remote user wants to establish a telehealth review, the remote user may use a user device to select the telehealth application 310 to be launched at the remote media device 140A. For example, if the remote user wants to establish a chat session, the remote user may use a user device to select the chat application 315 to be launched at the remote media device 140A. For example, if the remote user wants to establish a watch party with one or more other users, the remote user may use a user device to select the watch party application 320 to be launched at the remote media device 140A.

The remote user, via the user device, may select the other users to request or invite to be a part of the communication session. The number of other users invited or requested to be a part of the communication session can be one or greater than one. For example, the launched communication application on the remote media device 140A may request an indication of which other users to invite to the communication session. The remote user may input user identifying information via the user device to the remote media device 140A for the opened communication application. For example, the user identifying information can be any information that identifies another user and/or the media device, URL, or MAC address associated with that other user. The remote user may selected the number of other users to request or invite to the communication session and indicate to the remote media device 140A to send out an indication of the request or invitation. The remote media device 140A may send a notification of request or invitation to join the communication session to the identified other users via, for example, the communications application on the other media devices (e.g., the media devices 140B-C, 120.

At 710, a notification to begin a communication session may be received. For example, the notification (e.g., a notification of invitation or request to join a communication session from another user) may be associated with the user sending the request and the communications application the user is employing to send the request. For example, the notification may be received by the media device 120. For example, the remote media device 140A may send the notification to the media device 120 via the network 114 or another network. For example, the notification may include remote user media data (e.g., one or more of remote user audio data or remote user video data) recorded at a remote of the remote user and or at the remote media device 140A or display associated with the remote media device 140A. The media device 120 may receive the notification of the request or invitation to join the communication session from the remote media device 140A via the network 114 or another network.

At 720, the notification is determined to be associated with a communications application. For example, the notification may be determined to be associated with the particular communications application by the media device 120 (e.g., the resident application 220). For example, the media device 120 may parse the notification and identify from within the notification the remote user sending the request and the communications application to be used as part of the requested communication session. For example, the notification may identify the communications application and may be associated with particular communications application. Examples of the communications application include, but are not limited to, a telehealth application 310, a chat application 315, and a watch party application 320. Each of these communications applications may be configured to send and receive one or both of video data and audio data, which may be output by the media device 120 or a display 121 associated with the media device 120. For example, each of these communications applications may receive the audio data from a user device (e.g., the voice-enabled remote control 122, mobile device 123, the voice assistant device, the smart speaker, the Bluetooth headset, etc.) and may receive the video data from a camera associated with the media device and/or display associated with the media device.

At 730, the communications application associated with the notification may be initiated or opened. For example, the communications application may be initiated or opened by the media device 120. For example, initiating the communications application may comprise launching the communications application or causing the communications application to be launched. For example, initiating the communications application may comprise running the communications application or causing the communications application to be run. For example, initiating the communications application may comprise executing the communications application or causing the communications application to be executed.

For example, the media device 120 may determine which communications application to initiate or open. For example, determining which communications application to initiate or open may be based on the notification received by the media device 120. For example, the media device 120 (e.g., the resident application 220) may determine that the notification includes a request to use or is sent by a particular communications application. Based on this determination, the media device 120 may determine which communications application to open or initiate within the media device 120. The resident application 220, or another portion of the media device 120 may notify or send an instruction to the particular communications application (e.g., the telehealth application 310, the chat application 315, the watch party application 320, or another similar communications application) to open or initiate.

A communication session between the user device and media device 120 and the remote media device 140A (and optionally an associated user device of the remote media device 140A) associated with the remote user may be established. For example, establishing the communications session may comprise launching the communications session or causing the communications session to be launched. For example, establishing the communications session may comprise running the communications session or causing the communications session to be run. For example, establishing the communications session may comprise executing the communications session or causing the communications session to be executed. For example, establishing the communications may comprise opening the communications session or causing the communications session to be opened.

For example, the communication session may be established by the media device 120 and/or the remote media device 140A. For example, the media device 120 (e.g., the resident application 220) may determine the communications application associated with the notification has launched and is open, is launching, or has a request to be launched. The determination may be based on the received notification. The resident application 220 of the media device 120 may retrieve or generate a notification of the received notification and request or invitation to open or establish a communications session. The resident application 220 may display a message associated with the notification on the display device 121 associated with the media device 120 and request instructions for establishing the communication session between the user device and media device 120 and the media device 140A. For example, the user may accept the request (or provide an indication of acceptance of the request) based on an input at the user device (e.g., the voice-enabled remote control 122, mobile device 123, the voice assistant device, the smart speaker, the Bluetooth headset, etc.). For example, the input may comprise a button depressed by the user at the user device or the user providing a signal via audio data into the user device. For example, the signal may comprise audio data of the user stating "yes," "open," "accept," or the like.

At 740, remote media data (e.g., remote audio data and/or remote video data) may be received. For example, the remote media data may be received by the media device 120 from the remote media device 140A via the network 114 or another network. For example, the remote user may record the remote media data using a user device associated with the remote media device 140A and/or a camera associated with the user device or display associated with the remote media device 140A. For example, the remote audio data may comprise voice data from the remote user received via the user device associated with the remote media device 140A. For example, the remote media device 140A may include a virtual sound card substantially the same as described with the media device 120 and may similarly act as a virtual microphone with regard to providing the received remote audio data to the communications application for sending from the remote media device 140A to the media device 120. Once the communications session between the user device and media device 120 and the remote media device 140A is opened, the remote media data may be sent by the remote media device 140A to the media device 120. The remote media data may be received by the media device 120 (e.g., by the opened communications application).

At 750, the remote media data may be caused to be output. For example, the remote media data may be output or caused to be output by the media device 120. For example, the remote media data may be output or caused to be output by the particular communications application associated with the opened communications session between the media device 120 and the remote media device 140A. The particular communications application may output or cause to be output the remote media data at the media device 120 and/or the associated display device 121. For example, the particular communications application may cause the remote media data to be output via the web browser 212. For example, the display device 121 may output both the remote audio data and the remote video data of the remote media data.

At 760, local user audio data may be received. The local user audio data may be received by the media device 120 from a user device. For example, a user may speak into the microphone of the user device (e.g., the voice-enabled remote control 122, mobile device 123, the voice assistant device, the smart speaker, the Bluetooth headset, etc.). For example the audio data may be received prior to or in response to the all or a portion of the remote media data caused to be output at the display device 121.

The user device may convert the spoken language into the local user audio data. The user device may send the local user audio data to the media device 120. For example, the local user audio data may be sent to the media device 120 via wireless communication, such as Bluetooth, BLE, WiFi, RF, Zigbee or any other wireless communication. For example, the controller 206 of the media device 120 may receive the local user audio data from the user device via the communications module 202.

For example, the local user audio data may be determined to be associated with the open/active communications application. For example, the determination may be made by the media device 120 (e.g., the controller 206). For example, when the particular communications application is launched and the user accepts the request to open a communication session between the media device 120 and the remote media device 140A, the resident application 220 of the media device 120 can determine that one of the communications applications has launched and is active. The resident application 220 may send a signal or notification to the controller 206 of the media device 120 to route the audio data (e.g., local user audio data) received from the user devices to the open communications application. For example, based on the open communications application, the media device 120 (e.g., the controller 206) may determine that the local audio data is associated with the particular open communications application.

At 770, the local audio data may be sent to a remote media device (e.g., the remote media device 140A). For example, the local user audio data may be sent by the media device 120 and received by the remote media device 140A. For example, the local user audio data may be sent to the remote media device 140A via the gateway 124 and the network 114. For example, the local user audio data may be sent to the remote media device 140A based on a determination that the local user audio data is associated with the communications session.

For example, upon receiving the local user audio data from the user device (e.g., the voice-enabled remote control 122, mobile device 123, the voice assistant device, the smart speaker, the Bluetooth headset, etc.), the controller 206 may send the local user audio data to the audio sink 208 for processing through the virtual sound card 210. The virtual sound card 210 may receive the local user audio data and act as a virtual microphone for the media device 120. The virtual sound card 210 may send the local user audio data to the open communications application via the web browser 212. The particular communications application may send the received local user audio data to the remote media device 140A via the gateway 124 and the network 114.

The remote media device 140A may receive the local user audio data (and optionally local user video data). The remote media device 140A may output the local user audio data (and optionally the local user video data) at the remote media device 140A or a display associated with the local media device 140A). While the example describes receiving remote media data from a single remote media device and sending local audio data to a single remote media device, this is for example purposes only. In operation, the chat, watch party, and or telehealth communications applications (or other communications application) may involve a plurality of users associated with a plurality of remote media devices. As such, within a single communications session, the media device 120 may receive remote media data from a plurality of remote media devices and may send the local audio data to the plurality of remote media devices associated with a particular communications session.

While the communication session between the media device 120 and the remote media device 140A remain open and active, remote media data can continue to be sent by the remote media device 140A to the media device 120 for output on the associated display device 121 and additional local audio data may be received by the media device 120 from the user device and routed to the remote media device 140A to be output at the remote media device 140A or an associated display device.

The communication session may be terminated. For example the communication session may be terminated by one or more of the media device 120, the user device (e.g., the voice-enabled remote control 122, mobile device 123, the voice assistant device, the smart speaker, the Bluetooth headset, etc.), or the remote media device 140A. For example, the communication session may terminate upon the expiration of a timeout timer. The timeout timer may be a threshold amount of time during which no local audio data or remote media data is being passed from one device to another during the communication session. For example, the communication session may terminate based on a verbal or non-verbal command received by the media device 120 from the user device. For example, the user may press a button on the user device or submit a voice command to close the opened communications application.

The resident application 220, based on the communication session being terminated, may send a notification or instruction to the controller 206 of the media device that there are no communication applications open. Based on the notification from the resident application 220, the controller 206 may revert back to sending all received audio data from the user device to the computing device 102 to determine the command or instruction requested in the received audio data.

Figure 8:
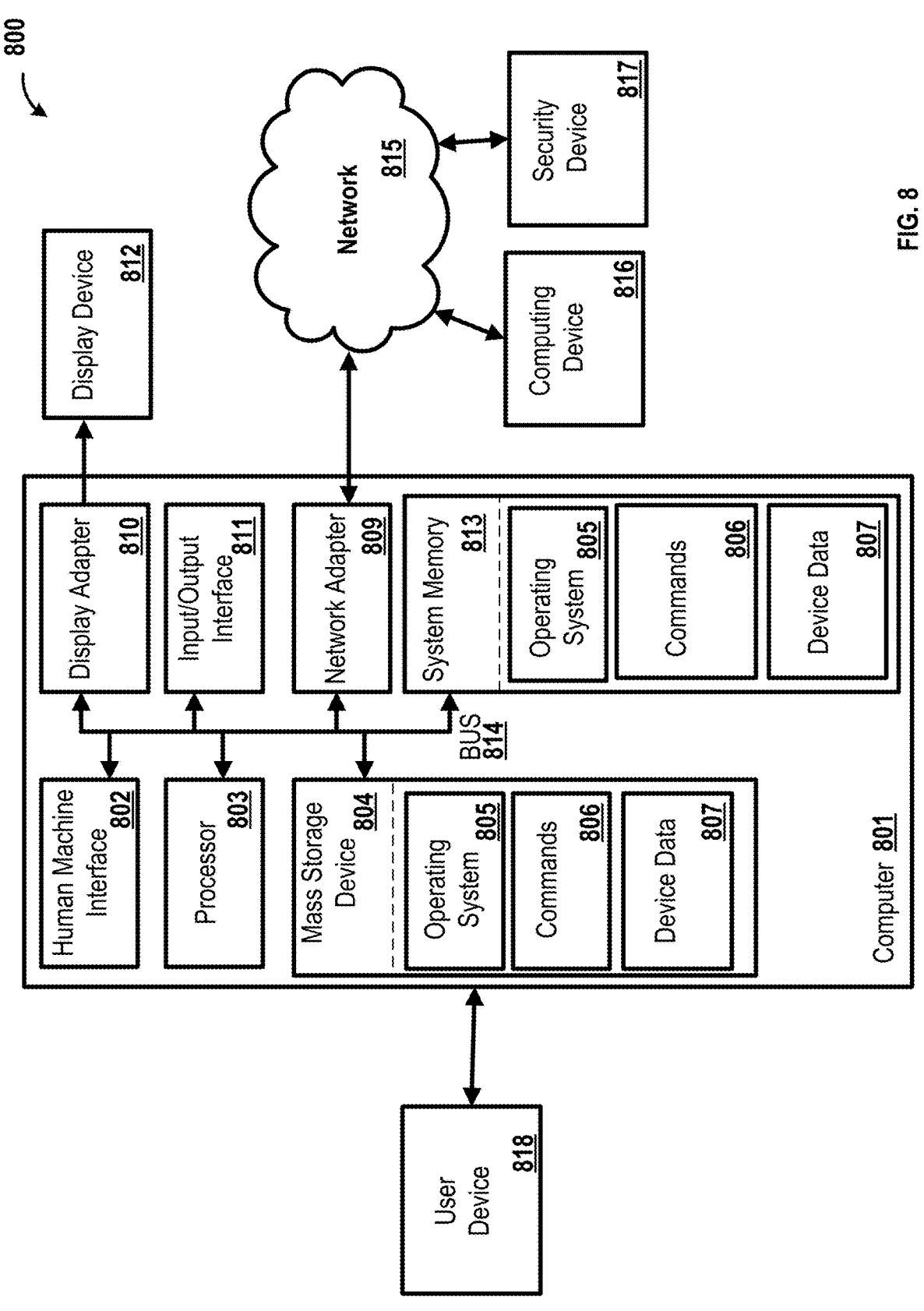
FIG. 8 shows a block diagram of an example computing device for managing communications.

FIG. 8 shows a system 800 for managing communications. Any one or more of the content source 104, computing device 102, computing device 106, media devices 120, 140A-C, gateway 124, user devices (e.g., the voice-enabled remote control 122, mobile device 123, the voice assistant device, the smart speaker, the Bluetooth headset, etc.) or security device (e.g., video doorbell 132 and/or security cameras 138A-B) of FIG. 1 may be a computer 801 as shown in FIG. 8.

The computer 801 may comprise one or more processors 803, a system memory 813, and a bus 814 that couples various components of the computer 801 including the one or more processors 803 to the system memory 813. In the case of multiple processors 803, the computer 801 may utilize parallel computing.

The bus 814 may comprise one or more of several possible types of bus structures, such as a memory bus, memory controller, a peripheral bus, an accelerated graphics port, and a processor or local bus using any of a variety of bus architectures.

The computer 801 may operate on and/or comprise a variety of computer-readable media (e.g., non-transitory). Computer-readable media may be any available media that is accessible by the computer 801 and includes, non-transitory, volatile and/or non-volatile media, and removable and non-removable media. The system memory 813 has computer-readable media in the form of volatile memory, such as random access memory (RAM), and/or non-volatile memory, such as read-only memory (ROM). The system memory 813 may store data and/or program modules such as an operating system 805, a commands database 806, and device data 807 that are accessible to and/or are operated on by the one or more processors 803.

The computer 801 may also comprise other removable/non-removable, volatile/non-volatile computer storage media. The mass storage device 804 may provide non-volatile storage of computer code, computer-readable instructions, data structures, program modules, and other data for the computer 801. The mass storage device 804 may be a hard disk, a removable magnetic disk, a removable optical disk, magnetic cassettes or other magnetic storage devices, flash memory cards, CD-ROM, digital versatile disks (DVD) or other optical storage, RAM, ROM, electrically erasable programmable read-only memory (EEPROM), and the like.

Any number of program modules may be stored on the mass storage device 804. An operating system 805, commands database 806, and device data 807 may be stored on the mass storage device 804. One or more of the operating system 805, commands database 806, and device data 807 (or some combination thereof) may comprise one or more program modules.

A user may enter commands and information into the computer 801 via an input device (not shown). Such input devices include, but are not limited to, a keyboard, pointing device (e.g., a computer mouse or remote control), a microphone, a joystick, a scanner, tactile input devices such as gloves, and other body coverings, a motion sensor, and the like These and other input devices may be connected to the one or more processors 803 via a human-machine interface 802 that is coupled to the bus 814, but may be connected by other interface and bus structures, such as a parallel port, game port, an IEEE 1394 Port (also known as a Firewire port), a serial port, network adapter 809, and/or a universal serial bus (USB).

A display device 812 may also be connected to the bus 814 via an interface, such as a display adapter 810. It is contemplated that the computer 801 may have more than one display adapter 810 and the computer 801 may have more than one display device 812. A display device 812 may be a monitor, an LCD (Liquid Crystal Display), a light-emitting diode (LED) display, a television, smart lens, smart glass, and/or a projector. In addition to the display device 812, other output peripheral devices may comprise components such as speakers (not shown) and a printer (not shown) which may be connected to the computer 801 via Input/Output Interface 811. Any step and/or result of the methods may be output (or caused to be output) in any form to an output device. Such output may be any form of visual representation, including, but not limited to, textual, graphical, animation, audio, tactile, and the like. The display 812 and computer 801 may be part of one device, or separate devices.

The computer 801 may operate in a networked environment using logical connections to one or more computing devices, such as the one or more remote computing devices 816, the one or more security devices 817, and the one or more user devices 818. The one or more remote computing devices 816 may comprise a personal computer, computing station, workstation, portable computer, laptop computer, a network computer, a server or cloud computing device, and so on. The one or more security devices 817 may comprise a video doorbell or security camera. The one or more user devices 818 may comprise one or more of a voice-enabled remote control, a mobile device, a voice assistant device, a smart speaker, a Bluetooth headset, a client device, a personal computer, computing station, workstation, portable computer, laptop computer, mobile phone, tablet device, smartphone, smartwatch, activity tracker, smart apparel, smart accessory, or the like. Logical connections between the computer 801, the one or more remote computing devices 816, the one or more security devices 817, and the one or more user devices 818 may be made via a network 815, such as a local area network (LAN) and/or a general wide area network (WAN) and one or more network devices (e.g., a router, an edge device, an access point or other common network nodes, such as a gateway). Such network connections may be through a network adapter 809. The network adapter 809 may be implemented in both wired and wireless environments. Such networking environments are conventional and commonplace in dwellings, offices, enterprise-wide computer networks, intranets, and the Internet.

Application programs and other executable program components such as the operating system 805, the commands database 806, and the device data 807 are shown herein as discrete blocks, although it is recognized that such programs and components may reside at various times in different storage components of the computing device 801, and are executed by the one or more processors 803 of the computer 801. Any of the disclosed methods may be performed by processor-executable instructions embodied on computer-readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:

receiving, by a media device configured to cause output of video content and audio content and from a video doorbell, an activation signal;

initiating, at the media device and based on the activation signal, a communications application associated with the video doorbell;

establishing, via the communications application, a communication session between the media device and the video doorbell;

receiving, by the media device and from a user device, user audio data; and sending, based on the user audio data being associated with the communications application, the user audio data from the media device to the video doorbell.

2. The method of claim 1, wherein establishing the communication session comprises:

causing, based on the initiation of the communications application, to be displayed a notification of a request for the communication session; and receiving, from the user device, an indication of an acceptance of the request for the communication session.

3. The method of claim 1, further comprising:

receiving, from the video doorbell, at least one of audio data or video data; and causing the at least one of the audio data or the video data to be output at a display device associated with the media device.

4. The method of claim 1, further comprising determining that the user audio data is associated with the communications application.

5. The method of claim 1, wherein the user device comprises at least one of: a voice-enabled remote control, a smartphone, a smart speaker, or a headset.

6. A method comprising:

receiving, by a media device configured to cause output of video content and audio and from a security camera, an activation signal;

initiating, at the media device and based on the activation signal, a communications application associated with the security camera;

establishing, via the communications application, a communication session between the media device and the security camera;

receiving, by the media device and from a user device, user audio data; and sending, based on the user audio data being associated with the communications application, the user audio data from the media device to the security camera.

7. The method of claim 6, wherein establishing the communication session comprises:

causing, based on the initiation of the communications application, to be displayed a notification of a request for the communication session; and receiving, from the user device, an indication of an acceptance of the request for the communication session.

8. The method of claim 6, further comprising:

receiving, from the security camera, at least one of audio data or video data; and causing the at least one of the audio data or the video data to be output at a display device associated with the media device.

9. The method of claim 6, further comprising determining that the user audio data is associated with the communications application.

10. The method of claim 6, wherein the user device comprises at least one of: a voice-enabled remote control, a smartphone, a smart speaker, or a headset.

11. One or more non-transitory computer-readable media storing processor-executable instructions that, when executed by at least one processor, cause the at least one processor to:

receive, by the at least one processor on a media device configured to cause output of video content and audio and from a video doorbell, an activation signal;

initiate, at the media device and based on the activation signal, a communications application associated with the video doorbell;

establish, via the communications application, a communication session between a device associated with the at least one processor and the video doorbell;

receive, from a user device, user audio data; and send, based on the user audio data being associated with the communications application, the user audio data from the media device to the video doorbell.

12. The one or more non-transitory computer-readable media of claim 11, wherein the processor-executable instructions that, when executed by the at least one processor, cause the at least one processor to establish the communication session, cause the at least one processor to:

cause, based on the initiation of the communications application, to be displayed a notification of a request for the communication session; and receive, from the user device, an indication of an acceptance of the request for the communication session.

13. The one or more non-transitory computer-readable media of claim 11, wherein the processor-executable instructions, when executed by the at least one processor, further cause the at least one processor to:

receive, from the video doorbell, at least one of audio data or video data; and cause the at least one of the audio data or the video data to be output at a display device associated with the at least one processor.

14. The one or more non-transitory computer-readable media of claim 11, wherein the processor-executable instructions, when executed by the at least one processor, further cause the at least one processor to determine that the user audio data is associated with the communications application.

15. The one or more non-transitory computer-readable media of claim 11, wherein the user device comprises at least one of: a voice-enabled remote control, a smartphone, a smart speaker, or a headset.

16. One or more non-transitory computer-readable media storing processor-executable instructions that, when executed by at least one processor, cause the at least one processor to:

receive, by the at least one processor on a media device configured to cause output of video content and audio and from a security camera, an activation signal;

initiate, at the media device and based on the activation signal, a communications application associated with the security camera;

establish, via the communications application, a communication session between a device associated with the at least one processor and the security camera;

receive, from a user device, user audio data; and send, based on the user audio data being associated with the communications application, the user audio data from the media device to the security camera.

17. The one or more non-transitory computer-readable media of claim 16, wherein the processor-executable instructions that, when executed by the at least one processor, cause the at least one processor to establish the communication session, cause the at least one processor to:

cause, based on the initiation of the communications application, to be displayed a notification of a request for the communication session; and receive, from the user device, an indication of an acceptance of the request for the communication session.

18. The one or more non-transitory computer-readable media of claim 16, wherein the processor-executable instructions, when executed by the at least one processor, further cause the at least one processor to:

receive, from the security camera, at least one of audio data or video data; and cause the at least one of the audio data or the video data to be output at a display device associated with the media device.

19. The one or more non-transitory computer-readable media of claim 16, wherein the processor-executable instructions, when executed by the at least one processor, further cause the at least one processor to determine that the user audio data is associated with the communications application.

20. The one or more non-transitory computer-readable media of claim 16, wherein the user device comprises at least one of: a voice-enabled remote control, a smartphone, a smart speaker, or a headset.

* * * * *